(12) United States Patent
Kang et al.

(10) Patent No.: US 9,406,264 B2
(45) Date of Patent: Aug. 2, 2016

(54) DISPLAY DEVICE

(71) Applicant: SAMSUNG DISPLAY CO., LTD., Yongin, Gyeonggi-Do (KR)

(72) Inventors: Jang Mi Kang, Bucheon-si (KR); Kyung-Hoon Kim, Uiwang-si (KR); Il Gon Kim, Seoul (KR); Pong Ok Park, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 142 days.

(21) Appl. No.: 13/670,761

(22) Filed: Nov. 7, 2012

(65) Prior Publication Data

US 2013/0321251 A1    Dec. 5, 2013

(30) Foreign Application Priority Data

Jun. 5, 2012    (KR) .................. 10-2012-0060269

(51) Int. Cl.
*G09G 3/36* (2006.01)
*G02F 1/1362* (2006.01)
*G02F 1/1345* (2006.01)

(52) U.S. Cl.
CPC ............ *G09G 3/36* (2013.01); *G02F 1/136286* (2013.01); *G09G 3/3614* (2013.01); *G02F 1/1345* (2013.01); *G09G 2300/0426* (2013.01)

(58) Field of Classification Search
CPC .................. G09G 3/36; G09G 3/3614; G09G 2300/0426; G02F 1/13
USPC .............. 345/87–104, 204, 205, 690; 349/38, 349/139, 152; 322/44; 711/131
See application file for complete search history.

(56) References Cited

U.S. PATENT DOCUMENTS

| | | | |
|---|---|---|---|
| 5,298,913 A | | 3/1994 | Numao et al. |
| 5,485,293 A | * | 1/1996 | Robinder .............. G02F 1/1368 345/88 |
| 5,648,792 A | * | 7/1997 | Sato .................... G09G 3/3648 345/100 |
| 6,081,250 A | | 6/2000 | Shimada et al. |
| 6,216,205 B1 | * | 4/2001 | Chin et al. .................... 711/131 |
| 6,292,237 B1 | * | 9/2001 | Hebiguchi ........ G02F 1/136213 349/141 |
| 6,590,553 B1 | | 7/2003 | Kimura et al. |
| 7,042,429 B2 | * | 5/2006 | Miyazawa et al. .............. 345/89 |
| 7,068,249 B2 | | 6/2006 | Kwon |
| 7,215,403 B2 | * | 5/2007 | Kimura ........................ 349/152 |
| 7,355,666 B2 | * | 4/2008 | Song .................... G02F 1/13624 349/139 |
| 7,944,414 B2 | * | 5/2011 | Shirasaki et al. .............. 345/77 |
| 8,041,000 B2 | | 10/2011 | Moon et al. |
| 8,207,921 B2 | * | 6/2012 | Lee et al. ........................ 345/87 |
| 2002/0118321 A1 | * | 8/2002 | Ge .................................. 349/73 |
| 2003/0107543 A1 | * | 6/2003 | Nakano et al. .................. 345/90 |
| 2004/0012554 A1 | * | 1/2004 | Song .................... G02F 1/13624 345/92 |

(Continued)

FOREIGN PATENT DOCUMENTS

JP    08006526 A    1/1996
KR    100431625 B1    5/2004

(Continued)

*Primary Examiner* — Prabodh M Dharia
(74) *Attorney, Agent, or Firm* — Cantor Colburn LLP

(57) ABSTRACT

A display device includes: a plurality of gate lines extending in a row direction; a plurality of data lines; a plurality of pixels connected to the gate lines and the data lines; and a gate signal supply line connected with at least two gate lines among the plurality of gate lines. At least three data lines among the plurality of data lines are between two pixels adjacent to each other in a row direction.

27 Claims, 23 Drawing Sheets

(56) References Cited

U.S. PATENT DOCUMENTS

| | | | |
|---|---|---|---|
| 2004/0145694 A1* | 7/2004 | Segawa et al. | 349/139 |
| 2005/0275610 A1* | 12/2005 | Roh | G09G 3/3614 345/88 |
| 2006/0034125 A1* | 2/2006 | Kim | G09G 3/3648 365/185.22 |
| 2006/0081850 A1* | 4/2006 | Lee | G02F 1/136286 257/72 |
| 2006/0092113 A1* | 5/2006 | Nitta et al. | 345/87 |
| 2006/0279260 A1* | 12/2006 | Tsuge | 322/44 |
| 2007/0085797 A1* | 4/2007 | Kim | 345/93 |
| 2007/0085959 A1* | 4/2007 | Kim | G02F 1/1345 349/143 |
| 2007/0097072 A1* | 5/2007 | Kim | G09G 3/3614 345/103 |
| 2008/0180372 A1* | 7/2008 | Kim | G09G 3/3677 345/87 |
| 2008/0180463 A1* | 7/2008 | Ogura | G09G 3/325 345/690 |
| 2008/0198116 A1* | 8/2008 | Kim | G09G 3/3648 345/89 |
| 2009/0195720 A1* | 8/2009 | Chou et al. | 349/39 |
| 2009/0316101 A1* | 12/2009 | Oh et al. | 349/143 |
| 2010/0277447 A1* | 11/2010 | Itoh et al. | 345/205 |
| 2010/0302471 A1* | 12/2010 | Kim et al. | 349/37 |
| 2011/0085098 A1* | 4/2011 | Liao et al. | 349/37 |
| 2011/0090194 A1* | 4/2011 | Chang | G06F 3/0412 345/207 |
| 2011/0187682 A1* | 8/2011 | Kim | G09G 5/00 345/204 |
| 2011/0241526 A1* | 10/2011 | Huang et al. | 313/307 |
| 2012/0075281 A1* | 3/2012 | Moon | G09G 3/003 345/212 |
| 2012/0075543 A1* | 3/2012 | Zeng | G02F 1/133514 349/42 |
| 2012/0120130 A1* | 5/2012 | Tang et al. | 345/694 |
| 2012/0176354 A1* | 7/2012 | Katsuta et al. | 345/204 |
| 2012/0249943 A1* | 10/2012 | Pai | G02F 1/134363 349/141 |
| 2012/0299971 A1* | 11/2012 | Hotelling et al. | 345/690 |
| 2012/0300133 A1* | 11/2012 | Saitoh | G09G 3/3607 348/731 |
| 2012/0307043 A1* | 12/2012 | Akiyama et al. | 348/125 |
| 2014/0078032 A1* | 3/2014 | Xia et al. | 345/92 |
| 2014/0375917 A1* | 12/2014 | Kim et al. | 349/39 |

FOREIGN PATENT DOCUMENTS

| | | |
|---|---|---|
| KR | 1020070071325 A | 7/2007 |
| KR | 100840329 B1 | 6/2008 |
| KR | 1020100069900 A | 6/2010 |
| KR | 101187207 B1 | 9/2012 |

* cited by examiner

DISPLAY DEVICE

This application claims priority to Korean Patent Application No. 10-2012-0060269 filed on Jun. 5, 2012, and all the benefits accruing therefrom under 35 U.S.C. §119, the entire contents of which are incorporated herein by reference.

BACKGROUND (a) Field

The invention relates to a display device, and more particularly, to a display device in which an image can be naturally displayed on a boundary of each display device configuring a multiple display device, by reducing a bezel.

(b) Description of the Related Art

Display devices are required for a computer monitor, a television, a mobile phone, and the like which are widely used. The display devices include a cathode ray tube display device, a liquid crystal display device, a plasma display device and the like.

The liquid crystal display device, which is one of the most common types of flat panel displays, includes two sheets of display panels with field generating electrodes such as a pixel electrode and a common electrode, and a liquid crystal layer interposed between the display panels. The liquid crystal display device generates an electric field in the liquid crystal layer by applying voltage to the field generating electrodes, and determines the direction of liquid crystal molecules of the liquid crystal layer by the generated electric field, thus controlling polarization of incident light so as to display an image.

Recently, the display device has been employed for outdoor use in many cases, and has used a multi-display device which displays an image on one screen by combining plural display devices arranged in a matrix form. The display device includes a display area in which an image is displayed, and a non-display device in which the image is not displayed. A gate driver, a data driver and the like are attached to an edge of the display device where the image is not displayed. The edge of the display device may form a portion of a bezel of the display device.

When the plural display devices are arranged in a matrix form, a bezel portion is disposed between adjacent display devices. Accordingly, a portion of the one-screen image at which the bezel is disposed between adjacent display devices is unnatural and disconnected.

SUMMARY

On or more exemplary embodiment of the invention has been made in an effort to provide a display device having advantages of naturally displaying a screen on a boundary of each display device configuring a multiple display device by reducing a bezel.

An exemplary embodiment of the invention provides a display device, including: a plurality of gate lines extending in a row direction; a plurality of data lines; a plurality of pixels connected to the gate lines and the data lines; and a gate signal supply line connected with at least two gate lines among the plurality of gate lines, in which at least three data lines among the plurality of data lines are disposed between two pixels adjacent to each other in a row direction.

The gate signal supply line may be connected to three gate lines, and three data lines may be disposed between the two pixels adjacent to each other in the row direction.

The three data lines disposed between the two pixels adjacent to each other in the row direction may include a first data line, a second data line and a third data line, the first to third data lines may be connected to different pixels, the first data line may be connected to two pixels adjacent to each other in a column direction, the second data line may be connected to two pixels adjacent to the two pixels connected to the first data line, at an upper side and at a lower side, respectively, in a column direction, and the third data line may be connected to two pixels adjacent to the two pixels connected to the second data line, at an upper side and at a lower side, respectively, in a column direction.

The first data line may extend in a column direction, the second data line may be disposed at the right of the first data line and surrounds the two pixels connected to the first data line, and the third data line may be disposed at the right of the second data line and surrounds the two pixels connected to the first data line and the two pixels connected to the second data line.

Three data lines disposed between the two pixels adjacent to each other in the row direction may include a first data line, a second data line and a third data line, the first to third data lines may be connected to different pixels, the first and third data lines may be connected to two pixels adjacent to each other in a column direction with three pixels therebetween, the second data line may be connected to two pixels adjacent to each other in a direction, the two pixels connected to the first data line may be disposed diagonal in the same column as a pixel disposed at the left of the two pixels connected to the second data line, and the two pixels connected to the third data line may be disposed in the same column as a pixel disposed at the right of the two pixels connected to the second data line.

The second data line may extend in a column direction, the first data line may be disposed at the left of the second data line and surround a pixel disposed at the left of the two pixels connected to the second data line, and the third data line may be disposed at the right of the second data line and surround a pixel disposed at the right of the two pixels connected to the second data line.

Three data lines disposed between the two pixels adjacent to each other in the row direction may include a first data line, a second data line and a third data line, the first to third data lines may be connected to different pixels, the second data line may be connected to two pixels adjacent to each other in a diagonal direction, the two pixels connected to the second data line including a left pixel and a right pixel, the third data line may be connected to a pixel at an upper side of the left pixel and a pixel at a lower side of the right pixel, and the first data line may be connected to two pixels adjacent to the two pixels connected to the third data line, in a diagonal direction, the two pixels connected to the first data line including an upper pixel and a lower pixel.

The first data line may surround two pixels between the lower pixel connected to the first data line and the left pixel connected to the second data line, the second data line may be at the right of the first data line, and may surround the two pixels surrounded by the first data line, the left pixel connected to the second data line and the lower pixel connected to the first data line, and the third data line may be at the right of the second data line, and may surround the four pixels surrounded by the second data line, a pixel at an upper side of the four pixels surrounded by the second data line, and the right pixel connected to the second data line.

The gate signal supply line may be connected to three gate lines, four data lines including a first data line, a second data line, a third data line and a fourth data line may be disposed between the two pixels adjacent to each other in the row direction, the first to fourth data lines may be connected to different pixels, the second data line may be connected to two pixels adjacent to each other in a column direction, the first data line may be connected to a pixel at a lower side of the two pixels connected to the second data line, in the column direction, the third data line may be connected to a pixel adjacent to the pixel connected to the second data line, in the column direction, with one pixel therebetween, and the fourth data line may be connected to a pixel adjacent to the pixel connected to the first data line and the pixel connected to the second data line, in a diagonal direction.

The first and second data lines may surround the two pixels adjacent to each other in the column direction and connected to the second data line, and the third and fourth data lines may extend in a column direction.

The gate signal supply line may include a first gate signal supply line including the same metal as the gate line; and a second gate signal supply line including the same metal as the data line.

The display device may further include a gate insulating layer on the at least two gate lines and the first gate signal supply line; a passivation layer on the gate insulating layer, the at least three data lines and the second gate signal supply line; a first contact hole in the passivation layer so as to expose at least a part of the second gate signal supply line; a second contact hole in the gate insulating layer and the passivation layer so as to expose at least a part of the gate line; and a first connection electrode connected with the second gate signal supply line through the first contact hole and connected with the at least two gate lines through the second contact hole.

The first gate signal supply line may be directly connected with the gate line.

The display device may further include a third contact hole in the gate insulating layer and the passivation layer so as to expose at least a part of the first gate signal supply line; and a second connection electrode connected with the first gate signal supply line through the third contact hole and connected with the at least two gate lines through the second contact hole.

A number of first contact holes and a number of third contact holes may be different from each other, and resistance between the first gate signal supply line and the at least two gate lines may be the same as resistance between the second gate signal supply line and the at least two gate lines.

The display device may further include a gate driver supplying a gate signal to the gate signal supply line; and a data driver supplying a data signal to the data line.

The gate signal supply line may have a once-bent structure.

The gate signal supply line may have a step shape, and the number of steps may be gradually increased as a distance from the gate driver increases.

The data driver may be disposed at one side of the display device, and the display device may further include a first gate driver and a second gate driver disposed at both edges of the one side.

A gate line connected to the gate signal supply line connected with the first gate driver and a gate line connected to the gate signal supply line connected with the second gate driver may be positioned in different rows of the display device.

The gate signal supply line may be connected with three gate lines, respectively, and gate lines connected to the gate signal supply line connected with the first gate driver and gate lines connected to the gate signal supply line connected with the second gate driver may be alternately disposed for every three gate lines.

The gate signal supply line may be connected with three gate lines, respectively, and gate lines connected to the gate signal supply line connected with the first gate driver and gate lines connected to the gate signal supply line connected with the second gate driver may be alternately disposed for every one gate line.

The data driver may be further disposed at the other side facing one side of the display device, the display device may further include a third gate driver and a fourth gate driver disposed at both edges of the other side, and a data line connected with the data driver disposed at one side of the display device and a data line connected with the data driver disposed at the other side of the display device may be disposed in the same column of the display device.

A gate line connected to the gate signal supply line connected with the first gate driver and a gate line connected to the gate signal supply line connected with the second gate driver may be disposed in the same row of the display device.

The data driver may be further disposed at the other side facing one side of the display device, the display device may further include a third gate driver and a fourth gate driver disposed at both edges of the other side, and a data line connected with the data driver disposed at one side of the display device and a data line connected with the data driver disposed at the other side of the display device may be disposed in the same column of the display device.

The display device may further include a data signal supply line connected between the data driver and at least the three data lines, in which data signals may be sequentially applied to at least the three data lines.

The data signal supply line may be connected with three data lines including a first data line, a second data line and a third data line, and may further include a first switching element connected between the data signal supply line and the first data line; a second switching element connected between the data signal supply line and the second data line; and a third switching element connected between the data signal supply line and the third data line, in which the first to third switching elements may be sequentially in a gate-on state.

One or more exemplary embodiment of the display device according to the invention as described above has the following effects.

According to one or more of the exemplary embodiments of the invention, a plurality of gate lines is connected to one gate signal supply line to be driven, such that it is possible to reduce the number of gate drivers.

Therefore, a gate driver and a data driver can be disposed at the same side of a single display device, such that a multi-display device includes sides of adjacent single display devices excluding the gate driver and the data driver are in contact with each other, such that it is possible to naturally connect screens of the adjacent single display devices on a boundary thereof.

Although the same gate signal is applied to the plurality of gate lines, the number of date lines is increased, such that it is possible to equally maintain resolution.

Further, gate signal supply lines are on and/or in different layers of the display device, such that it is possible to further reduce a bezel.

BRIEF DESCRIPTION OF THE DRAWINGS

The above and other features of the invention will become more apparent by describing in further detail exemplary embodiments thereof with reference to the accompanying drawings in which.

DETAILED DESCRIPTION

Figure 1:
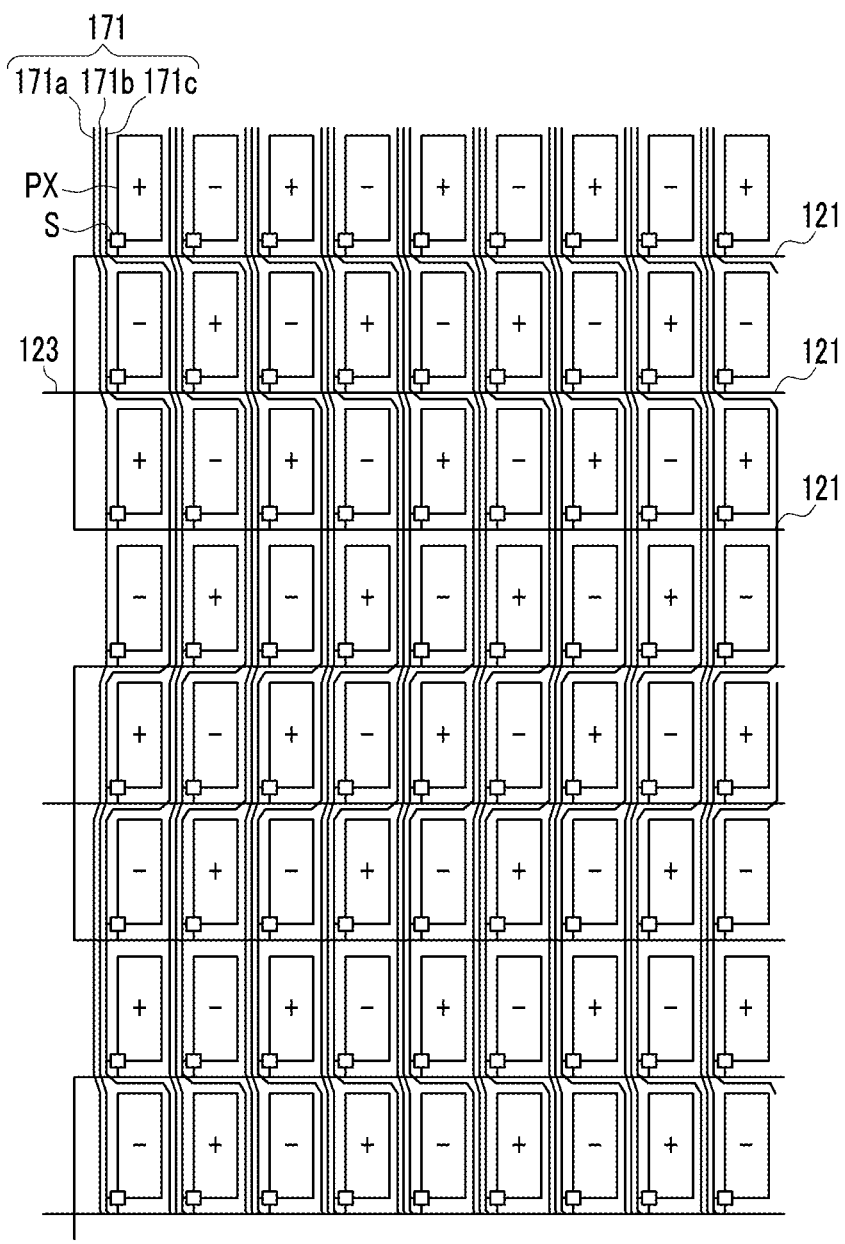
FIGS. 1 to 5 are plan views of exemplary embodiments of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

First, an exemplary embodiment of a display device according to the invention will be described below with reference to the accompanying drawings.

FIG. 1 is a plan view of an exemplary embodiment of a display device according to the invention.

The exemplary embodiment of a display device according to the invention includes a plurality of gate lines 121 extending in a row direction, a plurality of data lines 171 crossing the gate lines 121, and a plurality of pixels PX connected with the gate lines 121 and the data lines 171 through a switching element S.

A gate line 121 transfers a gate signal, and an on/off state of the switching element S is controlled by the gate signal.

Three gate lines 121 are connected to one gate signal supply line 123. Accordingly, the same gate signal via the gate signal supply line 123 is applied to the three gate lines 121 connected to a same gate signal supply line 123.

In FIG. 1, the three gate lines 121 are connected to one gate signal supply line 123, but the invention is not limited thereto. Two gate lines 121 may be connected to one gate signal supply line 123, and four or more gate lines 121 may also be connected to one gate signal supply line 123.

The gate signal supply line 123 is connected with the plurality of gate lines 121, thereby reducing the number of the gate signal supply lines 123 which pass through a gate fan out unit of the display device. In this case, as the gate signal supply line 123 is connected with an increasing number of gate lines 121, the number of the gate signal supply lines 123 may be further reduced.

An edge portion of the display device is within a bezel of the display device. Further, since the gate signal supply line 123 is disposed in and passes through the edge portion of the display device, reducing a number of the gate signal supply lines 123 thereby reduces a bezel width.

A data line 171 transfers a data signal, and includes a portion extending in a column direction and a portion extending in a row direction. In this case, the portion extending in a column direction crosses the gate line 121.

Three data lines 171 are disposed between two pixels PX which are adjacent to each other in a row direction. The three data lines 171 include a first data line 171a, a second data line 171b and a third data line 171c.

The first to third data lines 171a, 171b and 171c are connected to different pixels PX. Among the three data lines 171 disposed between the two pixels PX which are adjacent to each other in a row direction, the first data line 171a is disposed at the leftmost side in FIG. 1, the third data line 171c is disposed at the rightmost side of FIG. 1, and the second data line 171b is disposed between the first data line 171a and the third data line 171c in the row direction.

The first data line 171a is connected to two pixels PX which are adjacent to each other in a column direction. In the illustrated exemplary embodiment, for example, the pixel PX disposed in the third row and the pixel PX disposed in the fourth row among the pixels PX disposed in a matrix form, are adjacent to each other in a column direction and connected with the first data line 171a. With respect to the two pixels PX connected to the first data line 171a, the first data line 171a passes between the two connected pixels PX and two pixels PX adjacent thereto the row direction, and does not pass between the two pixels PX connected to the first data line 171a and adjacent to each other in a column direction.

The second data line 171b is connected to two pixels PX which are adjacent to the two pixels PX connected to the first data line 171a, in a column direction. In the illustrated exemplary embodiment, for example, the pixel PX disposed in the second row and the pixel PX disposed in the fifth row are respectively adjacent in the column direction to the pixels PX disposed in the third and fourth rows, and are connected with the second data line 171b.

The second data line 171b includes a portion extending in a column direction and a portion extending in a row direction. The portion extending in a column direction is disposed between two pixels PX which are adjacent to each other in the row direction, and the portion extending in a row direction is disposed between two pixels PX which are adjacent to each other in the column direction. The portion extending in the column direction and the portion extending in the row direction of the second data line 171b may form an angle of about 45 degrees with the portion extending in the row direction and the portion extending in the column direction, respectively.

The second data line 171b surrounds the two pixels PX connected to the first data line 171a. In the illustrated exemplary embodiment, for example, the pixel PX disposed in the third row and the pixel PX disposed in the fourth row are connected to the first data line 171a, and the second data line 171b surrounds an upper side and right side of the pixel PX disposed in the third row and surrounds the right side and lower side of the pixel PX disposed in the fourth row. As described above, the second data line 171b surrounds the sides of the pixels PX disposed in the third and fourth rows except for the left sides thereof, in order that a connection part of the first data line 171a and the pixels disposed in the third and fourth rows, are not electrically shorted with the second data line 171b.

The third data line 171c is connected to two pixels PX which are adjacent to the two pixels PX connected to the second data line 171b, in the column direction. In the illustrated exemplary embodiment, for example, the pixel PX disposed in the first row and the pixel PX disposed in the sixth row are respectively adjacent in the column direction to the pixels PX disposed in the second and fifth rows, and are connected with the third data line 171c.

The third data line 171c includes a portion extending in a column direction and a portion extending in a row direction. The portion extending in a column direction is disposed between two pixels PX which are adjacent to each other in the row direction, and the portion extending in a row direction is disposed between two pixels PX which are adjacent to each other in the column direction. The portion extending in the column direction and the portion extending in the row direction of the third data line 171c may form an angle of about 45 degrees with the portion extending in the row direction and the portion extending in the column direction respectively.

The third data line 171c surrounds the two pixels PX connected to the first data line 171a and the two pixels PX connected to the second data line 171b. In the illustrated exemplary embodiment, for example, the pixel PX disposed in the third row and the pixel PX disposed in the fourth row are connected to the first data line 171a, and the pixel PX disposed in the second row and the pixel PX disposed in the fifth row are connected to the second data line 171b. The third data line 171c surrounds the upper side and right side of the pixel PX disposed in the second row, the right sides of the pixels PX disposed in the third and fourth rows, and the right side and lower side of the pixel PX disposed in the fifth row. As described above, the third data line 171c surrounds the sides of the pixels PX disposed in the second to fifth rows except for the left sides thereof, in order that the connection part of the first data line 171a, the pixels PX disposed in the third and fourth rows, a connection part of the second data line 171b and the pixels PX disposed in the second and fifth rows, are not shorted with the third data line 171c.

Data signals having different polarities are applied to two adjacent data lines 171 at substantially a same time. In one exemplary embodiment, for example, when a negative data signal is applied to the first data line 171a, a positive data signal is applied to the second data line 171b and a negative data signal is applied to the third data line 171c. Further, a positive data signal is applied to the first data signal 171a adjacent to the third data line 171c with one pixel PX therebetween.

Further, data signals having different polarities are applied to the same data line 171 at adjacent times. In one exemplary embodiment, for example, after a negative data signal is applied to the first data line 171a at a first time, the positive data signal is applied to the first data line 171a at an adjacent second time.

As described above, a method of inverting a polarity of the data signal is called a dot inversion driving. The pixels PX which are vertically and horizontally adjacent to each other represent different polarities, such that it is possible to prevent deterioration and afterimage of a liquid crystal.

The pixel PX is connected with the gate line 121 and the data line 171 by the switching element S. The pixels PX disposed in the first to third rows receive gate signals from the same gate signal supply line 123 to be driven simultaneously.

The pixels PX disposed in the first to third rows are connected to different data lines 171 and thus may represent different grays.

The switching element S is disposed at the left lower end of the pixel PX, but the invention is not limited thereto and may be disposed at the upper left end thereof. Further, the switching element S may be positioned at the upper right end or lower right end of the pixel PX, but in this case, a layout of the data line 171 may also be changed.

The layout of the data line described above may be variously modified. Hereinafter, a modified exemplary embodiment of the layout of the data line will be described. However, the invention is not limited only to the layout of the data line described above, and may be modified in various different ways.

Hereinafter, another exemplary embodiment of a layout of a data line of a display device according to the invention will be described with reference to FIG. 2.

Figure 2:
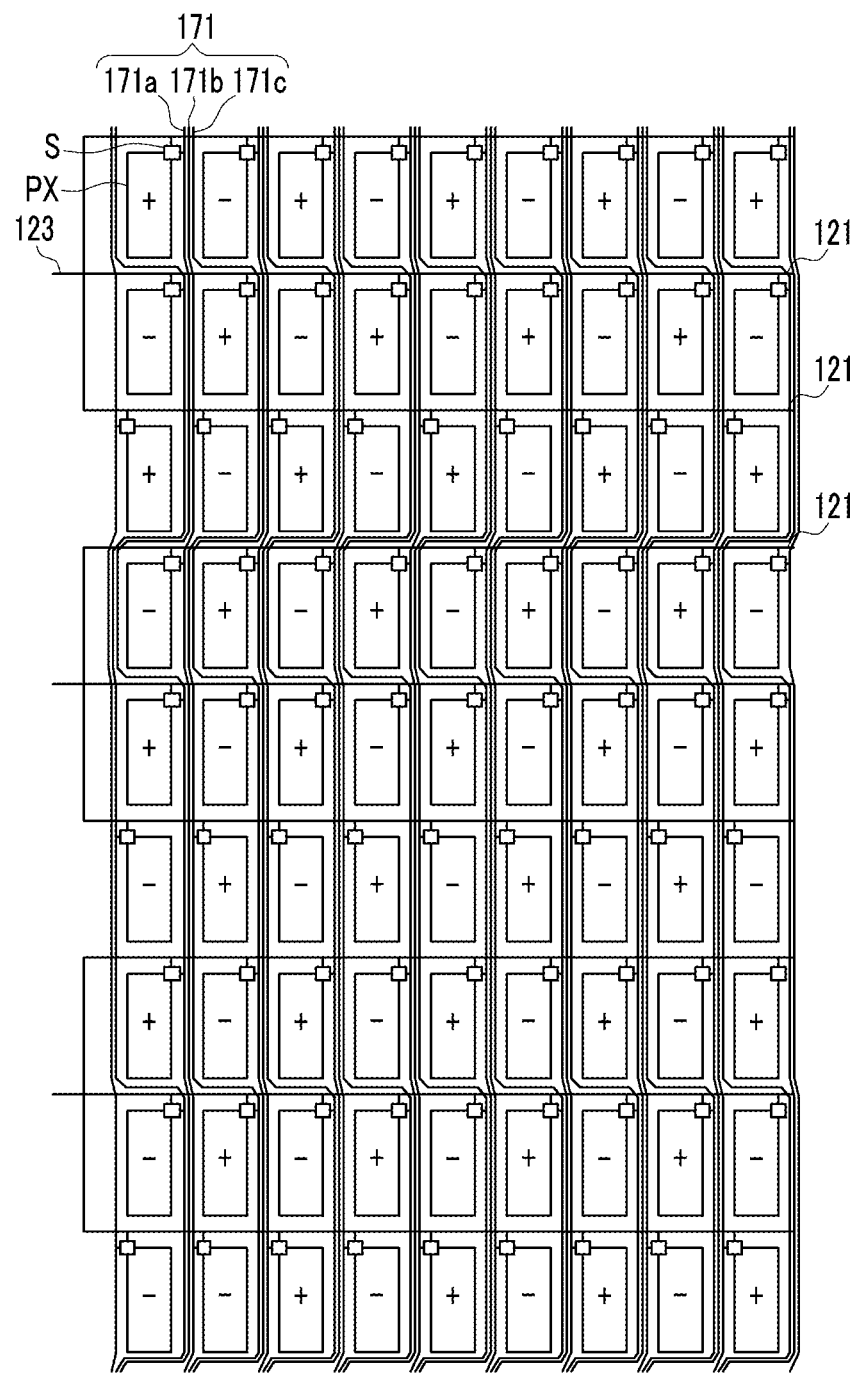

FIG. 2 is a plan view of another exemplary embodiment of a display device according to the invention.

Since a layout form of gate lines 121 and pixels PX of FIG. 2 is similar to that of FIG. 1, the description thereof is omitted and a layout form of data lines 171 will be mainly described below.

Three data lines 171 are disposed between two pixels PX adjacent to each other in a row direction. The three data lines 171 include a first data line 171a, a second data line 171b and a third data line 171c.

The first to third data lines 171a, 171b and 171c are connected to different pixels PX. Among the three data lines 171 disposed between the two pixels PX which are adjacent to each other in a row direction, the first data line 171a is disposed at the leftmost side, the third data line 171c is disposed at the rightmost side, and the second data line 171b is disposed between the first data line 171a and the third data line 171c. The second data line 171b is connected to two pixels PX which are adjacent to each other in a diagonal direction. In the illustrated exemplary embodiment, for example, the pixel PX disposed in the third row and the second column and the pixel PX disposed in the fourth row and the first column are adjacent to each other in a diagonal direction and connected with the second data line 171b. The second data line 171b is formed to pass between the two pixels PX which extend in a column direction to be adjacent to each other in a row direction and does not pass between the two pixels PX adjacent to each other in a column direction.

The first data line 171a is connected to two pixels PX adjacent to each other in a column direction with two pixels therebetween. In the illustrated exemplary embodiment, for example, the pixel PX disposed in the first row and the pixel PX disposed in the fifth row among the pixels PX disposed in the first column are adjacent to each other with three pixels therebetween and are connected with the first data line 171a.

The first data line 171a includes a portion extending in a column direction and a portion extending in a row direction. The portion extending in a column direction is disposed between two pixels PX which are adjacent to each other in the row direction, and the portion extending in a row direction is disposed between two pixels PX which are adjacent to each other in the column direction. The portion extending in the column direction and the portion extending in the row direction of the first data line 171a may form an angle of about 45 degrees with the portion extending in the column direction or the portion extending in the row direction.

The first data line 171a is formed to surround a pixel disposed at the left of two pixels PX connected to the second data line 171b. In the illustrated exemplary embodiment, for example, the pixel PX disposed in the fourth row and the first column is a pixel disposed at the left of two pixels connected to the second data line 171b, and the first data line 171a is formed to surround the upper side, left side, and lower side of the pixel disposed in the fourth row and the first column. As described above, the first data line 171a is formed to surround the sides except for the right side of the pixel PX disposed in the fourth row and the first column, in order that the connection part of the second data line 171b and the pixel PX disposed in the fourth row and the first column is not shorted with the first data line 171a.

The third data line 171c is connected to two pixels PX adjacent to each other in a column direction with three pixels therebetween. In the illustrated exemplary embodiment, for example, the pixel PX disposed in the second row and the pixel PX disposed in the sixth row among the pixels PX disposed in the second column are adjacent to each other in a column direction with three pixels therebetween and are connected with the third data line 171c.

The third data line 171c includes a portion extending in a column direction and a portion extending in a row direction. The portion extending in a column direction is disposed between two pixels PX which are adjacent to each other in the row direction, and the portion extending in a row direction is disposed between two pixels PX which are adjacent to each other in the column direction. The portion extending in the column direction and the portion extending in the row direction of the third data line 171c may form an angle of about 45 degrees with the portion extending in the column direction or the portion extending in the row direction.

The third data line 171c is formed to surround a pixel disposed at the right of two pixels PX connected to the second data line 171b. In the illustrated exemplary embodiment, for example, the pixel PX disposed in the third row and the second column is a pixel disposed at the right of two pixels connected to the second data line 171b, and the third data line 171c is formed to surround the right side and lower side of the pixel PX disposed in the third row and the second column. As shown in FIG. 2, the third data line 171c may be formed to surround the upper side and right side of the pixel PX disposed in the second row and the second column together. As described above, the third data line 171c is formed to surround the sides except for the left sides of the pixel PX disposed in the third row and the second column and the pixel PX disposed in the second row and the second column, in order that the connection part of the second data line 171b and the pixel PX disposed in the third row and the second column is not shorted with the third data line 171c.

Data signals having different polarities are applied to the two adjacent data lines 171 at the same timing. In the illustrated exemplary embodiment, for example, when a negative data signal is applied to the first data line 171a, a negative data signal is applied to the second data line 171b and a positive data signal is applied to the third data line 171c. Further, a negative data signal is applied to the first data signal 171a adjacent to the third data line 171c with one pixel PX therebetween.

Further, data signals having the same polarity are applied to the same data line 171 in the same frame. In the illustrated exemplary embodiment, for example, a positive data signal is continuously applied to the first data line 171a in the same frame.

As described above, a method of inverting a polarity of the data signal is called a column inversion driving. Since the data signals having the same polarity are applied to the same data line 171 during one frame, driving power consumption may be reduced. In the layout of the pixel PX as shown in FIG. 2, although the data signal is applied by the column inversion method, the pixels PX which are vertically and horizontally adjacent to each other represent different polarities, such that it is possible to have the same effect as the case of the dot inversion driving. Accordingly, it is possible to prevent deterioration and afterimage of a liquid crystal.

Positions of the switching elements S are repeated for every three rows. The switching elements S connected with the pixels PX disposed in the first row and the second row are disposed at the upper right ends of the pixels PX, and the switching element S connected with the pixel PX disposed in the third row is disposed at the upper left end of the pixel PX. However, the invention is not limited thereto and the position of the switching element S may be changed.

Next, another exemplary embodiment of a layout of a data line of a display device according to the invention will be described with reference to FIG. 3.

Figure 3:
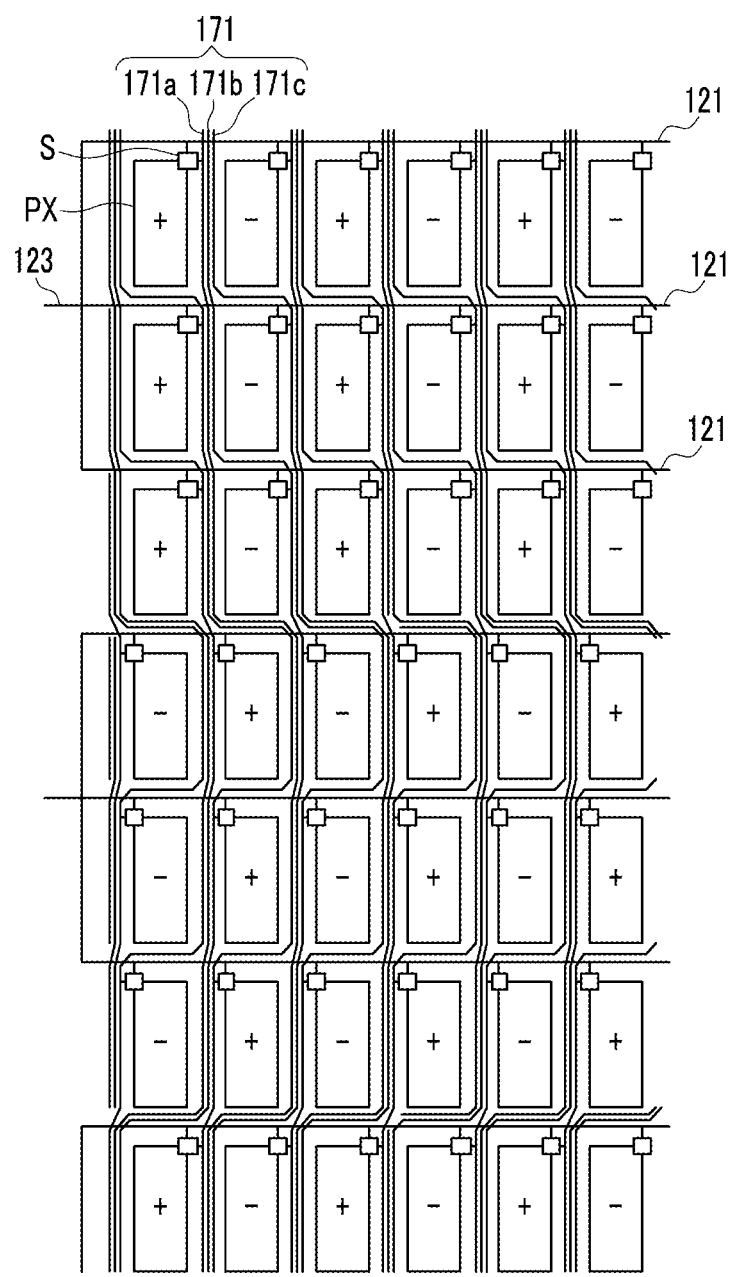

FIG. 3 is a plan view of another exemplary embodiment of a display device according to the invention.

Since a layout form of gate lines 121 and pixels PX of FIG. 3 is similar to that of FIG. 1, the description thereof is omitted and hereinafter, a layout form of data lines 171 will be mainly described.

Three data lines 171 are disposed between two pixels PX which are adjacent to each other in a row direction. The three data lines 171 include a first data line 171a, a second data line 171b and a third data line 171c.

The first to third data lines 171a, 171b and 171c are connected to different pixels PX. Among the three data lines 171 disposed between the two pixels PX which are adjacent to each other in a row direction, the first data line 171a is disposed at the leftmost side, the third data line 171c is disposed at the rightmost side, and the second data line 171b is disposed between the first data line 171a and the third data line 171c.

The second data line 171b is connected to two pixels PX which are adjacent to each other in a diagonal direction. In the illustrated exemplary embodiment, for example, the pixel PX disposed in the third row and the second column and the pixel PX disposed in the fourth row and the third column are adjacent to each other in a diagonal direction, and are connected with the second data line 171b. The third row, second column pixel PX may be considered a left pixel connected to the second data line 171b, and the fourth row, third column pixel PX may be considered a right pixel connected to the second data line 171b.

The third data line 171c is connected to the pixel PX disposed at the upper side of the left pixel PX connected to the second data line 171b and the pixel PX disposed at the lower side of the right pixel PX connected to the second data line 171b. In the illustrated exemplary embodiment, for example, the pixel PX disposed in the second row and the second column is disposed at the upper side of the left pixel PX connected to the second data line 171b, and is connected with the third data line 171c. Further, the pixel PX disposed in the fifth row and the third column is disposed at the lower side of the right pixel PX connected to the second data line 171b, and is connected with the third data line 171c. The second row, second column pixel PX may be considered an upper side pixel PX connected to the third data line 171c, and the fifth row, third column pixel PX may be considered a lower side pixel connected to the third data line 171c.

The first data line 171a is connected to two pixels PX in a diagonal direction from the two pixels connected to the third data line 171c. In the illustrated exemplary embodiment, for example, the pixel PX disposed in the first row and the first column is diagonally adjacent to the upper side pixel PX connected to the third data line 171c, and is connected with the first data line 171a. Further, the pixel PX disposed in the sixth row and the second column is diagonally adjacent to the lower side pixel PX connected to the third data line 171c, and is connected with the first data line 171a. The first row, first column pixel PX may be considered an upper pixel connected to the first data line 171a, and the sixth row, second column pixel PX may be considered a lower pixel connected to the first data line 171a.

The first to third data lines 171a, 171b and 171c include portions extending in a column direction and portions extending in a row direction.

The first data line 171a surrounds the two pixels disposed between the lower pixel PX connected to the first data line 171a and the left pixel PX connected to the second data line 171b. In the illustrated exemplary embodiment, for example, the pixel PX disposed in the fourth row and the second column and the pixel PX disposed in the fifth row and the second column are disposed between the lower pixel PX connected to the first data line 171a and the left pixel PX connected to the second data line 171b. The first data line 171a surrounds the pixel PX disposed in the fourth row and the second column and the pixel PX disposed in the fifth row and the second column.

The second data line 171b surrounds the two pixels PX surrounded by the first data line 171a and the two pixels PX disposed at the upper side and the lower side of the two pixels PX surrounded by the first data line 171a. In the illustrated exemplary embodiment, for example, the pixel PX disposed in the third row and the second column is disposed at the upper side of the two pixels PX surrounded by the first data line 171a, and a pixel PX disposed in the sixth row and the second column is disposed at the lower side of the two pixels PX surrounded by the first data line 171a. The second data line 171b surrounds pixels PX disposed in the third to sixth rows.

The third data line 171c surrounds the, the pixel PX disposed at the upper side of the two four pixels PX surrounded by the second data line 171b, and the right pixel PX connected to the second data line 171b. In the illustrated exemplary embodiment, for example, a pixel PX disposed in the second row and the second column is a pixel PX disposed at the upper side of the four pixels PX surrounded by the second data line 171b, and a pixel PX disposed in the fourth row and the third column is the right pixel PX connected to the second data line 171b. The third data line 171c surrounds pixels PX disposed in the second column and the second to sixth rows and a pixel PX disposed in the fourth row and the third column.

Data signals having different polarities are applied to each of the three data lines 171 at a same time. In one exemplary embodiment, for example, positive data signals are applied to the second data line 171b disposed at the left of a pixel PX disposed at the leftmost side (i.e., the first column, first row pixel PX), the third data line 171c at the left of a pixel PX disposed at the leftmost side, and the first data line 171a disposed between the pixel PX in the first column and the pixel PX in the second column. Further, negative data signals are applied to the second data line 171b disposed between the pixel PX in the first column and the pixel PX in the second column, the third data line 171c between the pixel PX in the first column and the pixel PX in the second column, and the first data line 171a disposed between the pixel PX in the second column and the pixel PX in the third column.

Further, data signals having the same polarity are applied to the same data line 171 in the same frame. In one exemplary, for example, a positive data signal is continuously applied to the first data line 171a disposed between the pixel PX in the first column and the pixel PX in the second column in the same frame.

As described above, a method of inverting a polarity of the data signal is called a column inversion driving. In the layout of the pixel PX as shown in FIG. 3, although the data signal is applied by the column inversion method, the pixels which are adjacent to each other in a row direction represent different polarities and polarities of the pixels which are adjacent to each other in a column direction are inverted for every three pixels PX. That is, it is possible to have the same effect as the case of a 3-dot inversion driving.

Positions of the switching elements S are repeated for every six rows, and alternate every three rows. The switching element S connected with pixels PX disposed in the first row, the second row, and the third row is disposed at the upper right end of the pixels PX, and the switching element S connected with pixels PX disposed in the fourth, fifth and sixth rows is disposed at the upper left end of the pixels PX. However, the invention is not limited thereto and the position of the switching element S may be changed.

Next, another exemplary embodiment of a layout of a data line of a display device according to the exemplary embodiment of the invention will be described with reference to FIG. 4.

Figure 4:
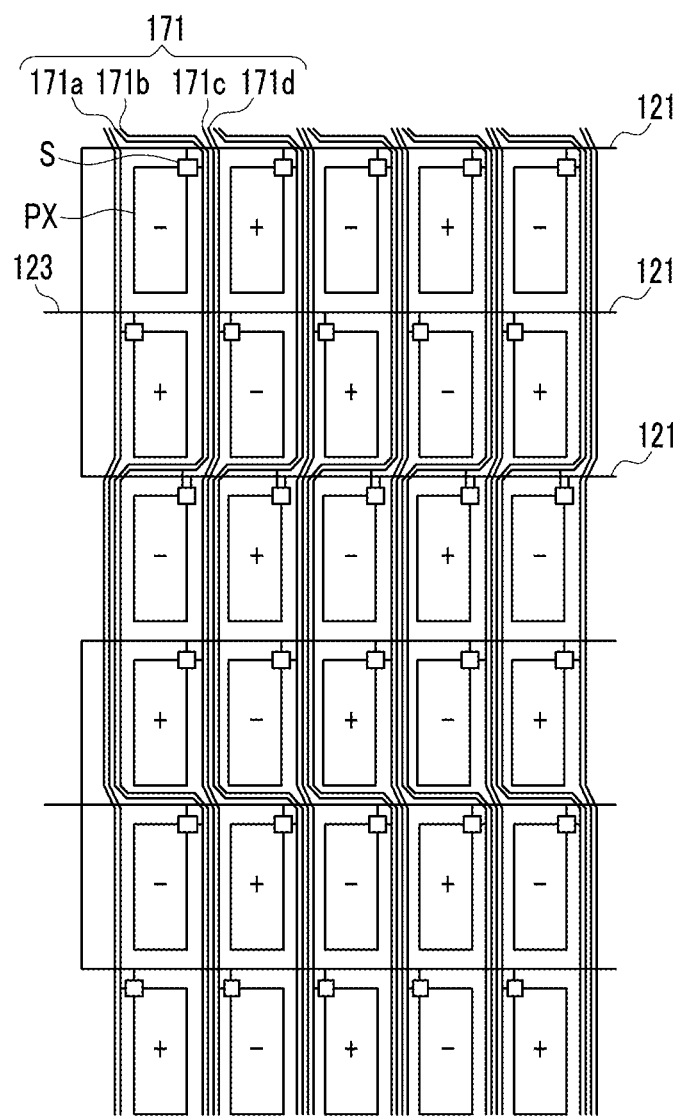

FIG. 4 is a plan view of another exemplary embodiment of a display device according to the invention.

Since a layout form of gate lines 121 and pixels PX of FIG. 4 is similar to that of FIG. 1, the description thereof is omitted and hereinafter, a layout form of data lines 171 will be mainly described.

Four data lines 171 are disposed between two pixels PX which are adjacent to each other in a row direction. The four data lines 171 include a first data line 171a, a second data line 171b, a third data line 171c and a fourth data line 171d.

The first to fourth data lines 171a, 171b, 171c and 171d are connected to different pixels PX. Among the four data lines 171 disposed between two pixels PX which are adjacent to each other in a row direction, the first data line 171a is disposed at the leftmost side, and the second data line 171b is disposed at the next right of the first data line 171a. The third data line 171c is disposed at the next right of second data line 171b, and the fourth (rightmost) data line 171d is disposed at the next right of the third data line 171c.

The second data line 171b is connected to two pixels PX adjacent to each other in a column direction. In the illustrated exemplary embodiment, for example, a pixel PX disposed in the third row and the first column and a pixel PX disposed in the fourth row and the first column are adjacent to each other in a column direction, and are connected with the second data line 171b.

The third data line 171c is connected to a pixel PX disposed at the lower side of the two pixels PX adjacent to each other in a column direction. In the illustrated exemplary embodiment, for example, a pixel PX disposed in the fourth row and the first column is disposed at the lower side of the pixel in the third row and the first column, and is connected with the third data line 171c.

The first data line 171a is connected to a pixel PX adjacent to the pixel PX connected to the second data line 171b with one pixel PX therebetween in a column direction. In the illustrated exemplary embodiment, for example, a pixel PX disposed in the first row and the first column is adjacent to a pixel PX disposed in the third row and the first column with one pixel PX therebetween in a column direction, and is connected with the first data line 171a.

The fourth data line 171d is connected with a pixel PX adjacent to the pixel PX connected to the first data line 171a and the pixel PX connected to the second data line 171b, in a diagonal direction. In the illustrated exemplary embodiment, for example, a pixel PX connected with the fourth data line 171d and disposed in the second row and the second column, is adjacent to a pixel PX disposed in the first row and the first column connected to the first data line 171a and adjacent to a pixel PX disposed in the third row and the first column connected to the second data line 171b, in a diagonal direction.

The first data line 171a and the second data line 171b include portions extending in a column direction and portions extending in a row direction and are formed in parallel to each other. The first and second data lines 171a and 171b surround the two pixels PX connected to the second data line 171b. That is, the first and second data lines 171a and 171b surround two pixels PX adjacent to each other in a column direction.

The third data line 171c and the fourth data line 171d extend in a column direction to pass between two pixels PX adjacent to each other in a row direction, and do not pass between two pixels PX adjacent to each other in a column direction.

Polarities of the data signals applied to the data line 171 are repeated for every eight data lines 171. In one exemplary embodiment, for example, when negative data signals are applied to the first data line 171a, the second data line 171b, and the fourth data line 171d which are disposed between the pixel PX in the first column and the pixel PX in the second column, a positive data signal is applied to the third data line 171c. Further, positive data signals are applied to the first data line 171a, the second data line 171b, and the fourth data line 171d which are disposed between the pixel PX in the second column and the pixel PX in the third column, and a negative data signal is applied to the third data line 171c.

Polarity patterns of the data signals are repeated, and thus negative data signals are applied to the first data line 171a, the second data line 171b, and the fourth data line 171d which are disposed between the pixel PX in the third column and the pixel PX in the fourth column, and a positive data signal is applied to the third data line 171c. Further, positive data signals are applied to the first data line 171a, the second data line 171b, and the fourth data line 171d which are disposed between the pixel PX in the fourth column and the pixel PX in the fifth column, and a negative data signal is applied to the third data line 171c.

Further, data signals having the same polarity are applied to the same data line 171 in a same time and/or frame. In one exemplary embodiment, for example, the negative data signal is continuously applied to the first data line 171a disposed between the pixel PX in the first column and the pixel PX in the second column in the same frame.

In the layout of the pixel PX as shown in FIG. 4, although the data signal is applied by the column inversion method, the pixels which are vertically and horizontally adjacent to each other represent different polarities, such that it is possible to have the same effect as the case of the dot inversion driving.

Positions of the switching elements S are repeated for every four rows. The switching elements S connected with the pixels PX disposed in the first row, the third row, and the fourth row are disposed at the upper right ends of the pixels PX, and the switching element S connected with the pixel PX disposed in the second row is disposed at the upper left end of the pixel PX. However, the invention is not limited thereto and the position of the switching element S may be changed.

Next, an exemplary embodiment of a gate driver and a data driver of a display device according to the invention will be described below with reference to FIG. 5.

Figure 5:
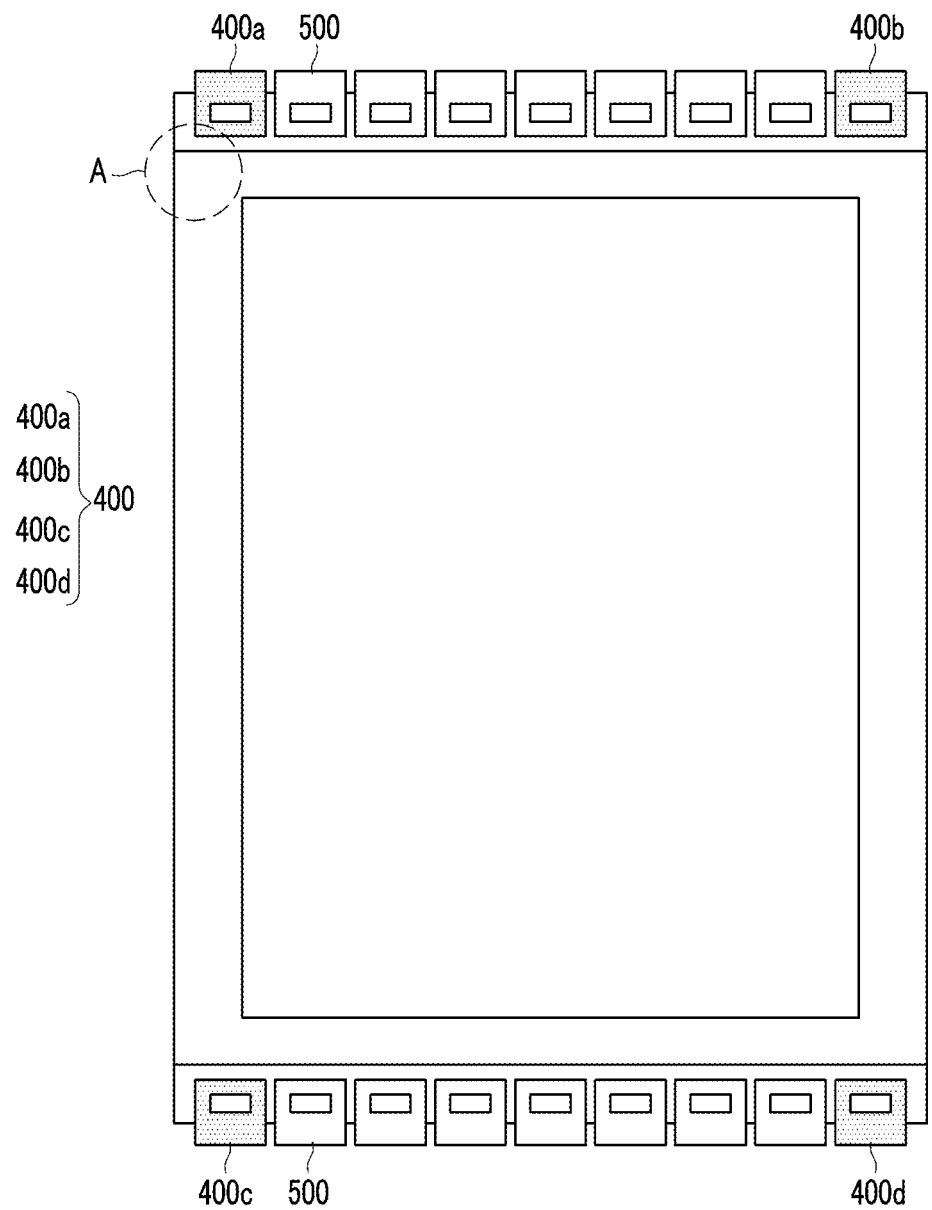

FIG. 5 is an exemplary embodiment of a plan view of a display device according to the invention.

The exemplary embodiment of a display device according to the invention further includes a gate driver 400 transmitting a gate signal and a data driver 500 transmitting a data signal.

The data driver 500 is disposed at one side of the display device. In the illustrated exemplary embodiment, for example, the display device may have a rectangular shape having four sides (two long and two short) and the data driver 500 may be disposed at the upper side of the display device.

Further, the data driver 500 may be further disposed at a side facing the one side of the display device. In the illustrated exemplary embodiment, for example, the data driver 500 may be disposed at the lower side of the display device.

A plurality of data drivers 500 may be disposed at the one side and/or the other side of the display device with predetermined intervals therebetween, respectively.

The gate drivers 400 include a first gate driver 400a and a second gate driver 400b which are disposed at both edges of the one side of the display device with the data driver 500. In the illustrated exemplary embodiment, for example, the first gate driver 400a may be disposed at the left edge of the upper side of the display device, and the second gate driver 400b may be disposed at the right edge of the upper side of the display device.

Further, the gate drivers 400 may further include a third gate driver 400c and a fourth gate driver 400d which are disposed at both edges of the other side facing one side of the display device. In the illustrated exemplary embodiment, for example, the third gate driver 400c may be disposed at the left edge of the lower side of the display device, and the fourth gate driver 400d may be disposed at the right edge of the lower side of the display device.

In the exemplary embodiment of the display device according to the invention, as described above, the gate driver 400 and the data driver 500 may be disposed at the same side of the display device. The gate driver 400 and the data driver 500 may be disposed at the same side of the display device since the number of the gate drivers 400 may be reduced by connecting three gate lines to one gate signal supply line to supply the same gate signal for every three gate lines.

Accordingly, the gate driver 400 and the data driver 500 are disposed at the one side or/and the other side facing one side of the display device, such that it is possible to reduce bezel widths of remaining sides of the display device. The remaining sides having narrow bezel widths may be used as a connection part of two display devices adjacent to each other in a multi-display device. In this case, connection of screens of the adjacent display devices and display of an image may become natural due to the narrow bezel width at the connection part.

Next, an exemplary embodiment of a gate signal supply line of the display device according to the invention will be described below with reference to FIGS. 6 and 7.

Figure 6:
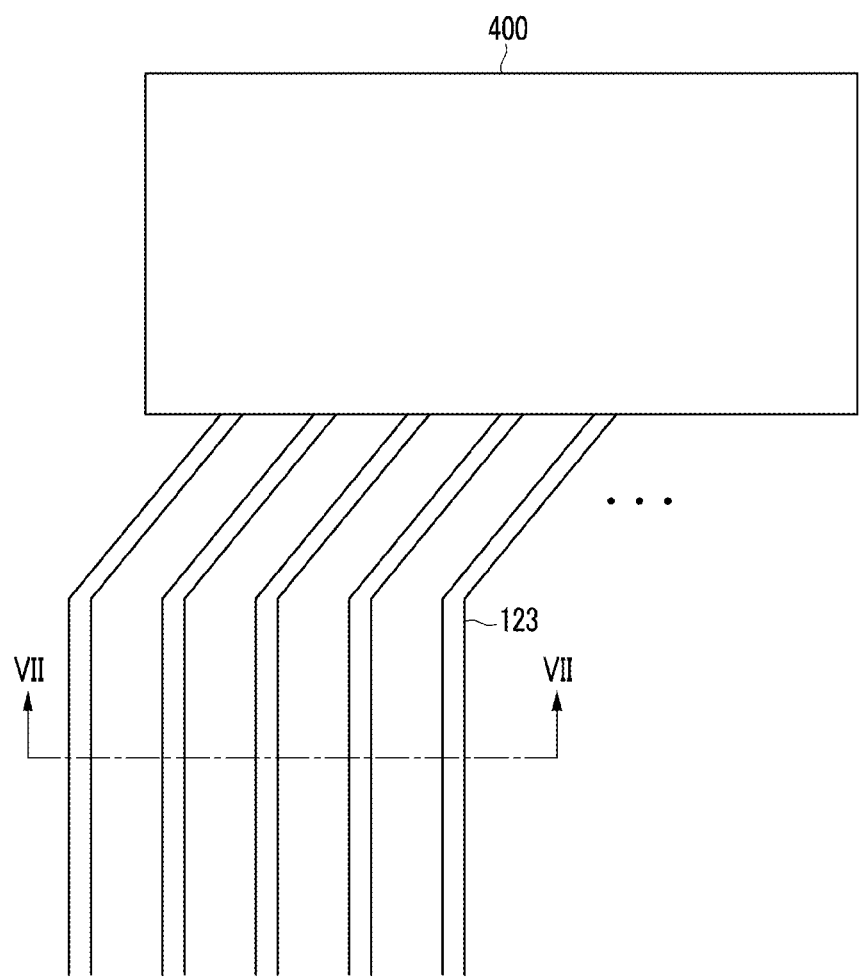
FIG. 6 is a partially enlarged view of an exemplary embodiment of region A of the display device in FIG. 5, according to the invention.
Figure 7:
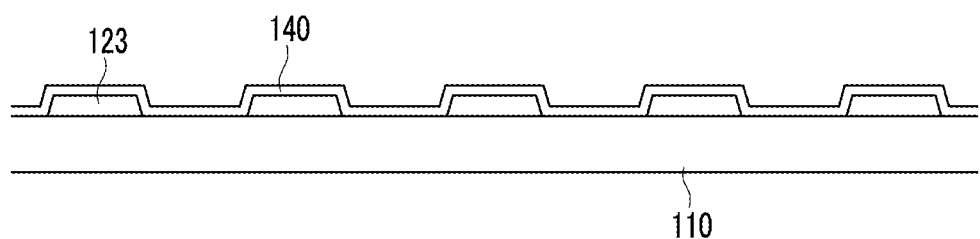
FIG. 7 is a partial cross-sectional view of the exemplary embodiment of the display device taken along line VII-VII of FIG. 6, according to the invention.

FIG. 6 is a partially enlarged view of an exemplary embodiment of a region A of the display device in FIG. 5 according to the invention, and FIG. 7 is a partial cross-sectional view of an exemplary embodiment of the display device taken along line VII-VII of FIG. 6, according to the invention.

A first end of a gate signal supply line 123 is connected to the gate driver 400, and the gate signal supply line 123 receives a gate signal from the gate driver 400.

A plurality of gate signal supply lines 123 are disposed at one side of the gate driver 400 with predetermined intervals therebetween. In a plan view, the gate signal supply line 123 has a bent shape at a predetermined angle so as to be in a non-display area beyond a display area of the display device.

All of the plurality of gate signal supply lines 123 may be on and/or in a same layer of the display device. That is, in one exemplary embodiment, the plurality of gate signal supply lines 123 may be formed on a substrate 110, and a gate insulating layer 140 may be formed to cover the gate signal supply line 123.

In this case, where the plurality of gate signal supply lines 123 may be on and/or in a same layer of the display device the gate signal supply line 123 may include a same metal as the gate line, and be on and/or in a same layer as the gate line within the display device.

While the exemplary embodiment illustrates all the gate signal supply lines 123 on the same layer, the invention is not limited thereto and the gate signal supply lines 123 may be on different layers from each other and/or the gate line.

Hereinafter, alternative exemplary embodiments of a layout form of gate signal supply lines of the display device according to the invention will be described below with reference to FIGS. 8 to 10.

Figure 8:
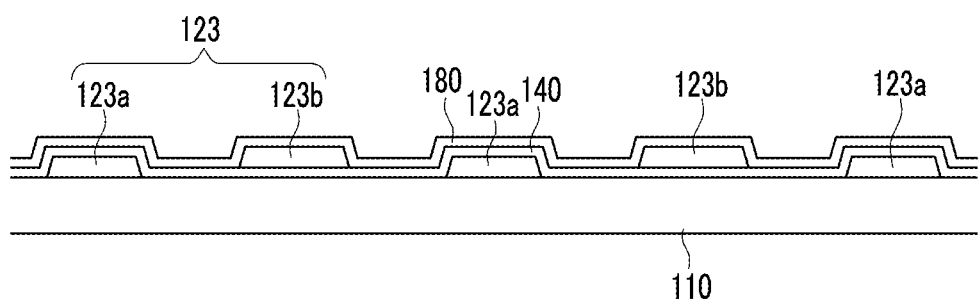
FIGS. 8 to 10 are partial cross-sectional views of alternative exemplary embodiments of a display device according to the invention.
Figure 9:
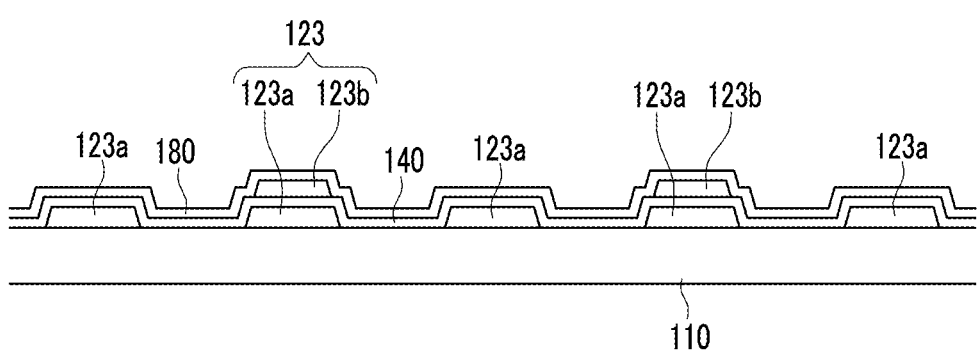
Figure 10:
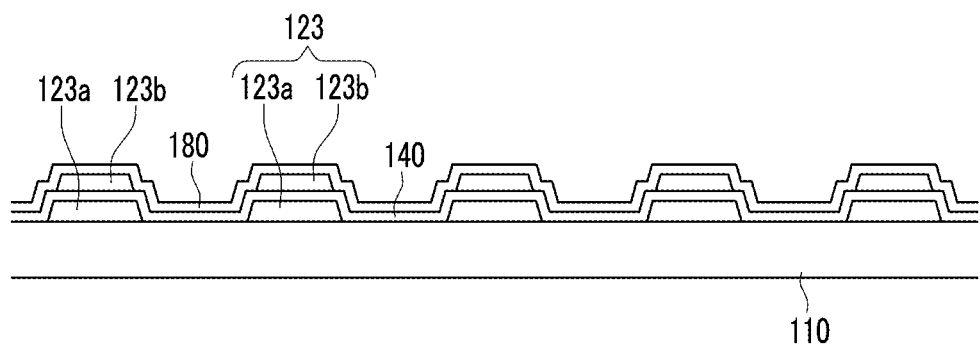

FIGS. 8 to 10 are partial cross-sectional views of alternative exemplary embodiments of a display device according to the invention.

The gate signal supply lines 123 may also be on and/or in two different layers as shown in FIG. 8.

In the illustrated exemplary embodiment, for example, the gate signal supply lines 123 may include a first gate signal supply line 123a on and/or in a same layer as a gate line (not shown), and a second gate signal supply line 123b on and/or in a same layer as a data line (not shown). The first gate signal supply line 123a may include a same metal as the gate line, and may be formed together (e.g., at substantially a same time and/or in a same process) when the gate line is formed. The second gate signal supply line 123b may include a same metal as the data line, and may be formed together with the data line when the data line is formed.

The first gate signal supply line 123a and the second gate signal supply line 123b are alternately disposed along the substrate 110. A distance between two adjacent gate signal supply lines 123, or between first and second gate signal supply lines 123a and 123b of the case shown in FIG. 8 may be smaller than that of the case shown in FIG. 7. Since the first gate signal supply line 123a and the second gate signal supply line 123b are disposed to be adjacent to each other, and are on and/or in different layers of the display device, concern about an electrical short is small as compared with the case shown in FIG. 7.

As described above, since the gate signal supply lines 123 are on and/or in different layers, an area occupied by the gate signal supply lines 123 may be reduced. Accordingly, it is possible to reduce a bezel width of the display device in a portion in which the gate signal supply lines 123 are disposed.

Referring to FIG. 9, the first gate signal supply line 123*a* and the second gate signal supply line 123*b* are on and/or in different layers may be overlapped with each other in a partial region.

According to the case shown in FIG. 9, since a planar area occupied by the gate signal supply lines 123 may be more reduced as compared with the case shown in FIG. 8, a bezel width may become even smaller.

Referring to FIG. 10, the first gate signal supply line 123*a* and the second gate signal supply line 123*b* may also be overlapped with each other in all regions.

According to the case shown in FIG. 10, since the area occupied by the gate signal supply lines 123 may be more reduced as compared with the case shown in FIG. 9, a bezel width may become even smaller.

As described above, the first gate signal supply line 123*a* is on and/or in the same layer as the gate line and the second gate signal supply line 123*b* is on and/or in the same layer as the data line, but the invention is not limited thereto. In alternative exemplary embodiments, the first gate signal supply line 123*a* and/or the second gate signal supply line 123*b* may be formed by a separate process from the gate line and the data line, and/or may also be formed together when metal layers other than the gate and data lines are formed.

Next, an exemplary embodiment of a connection part of the gate signal supply line and the gate line will be described below.

Figure 11:
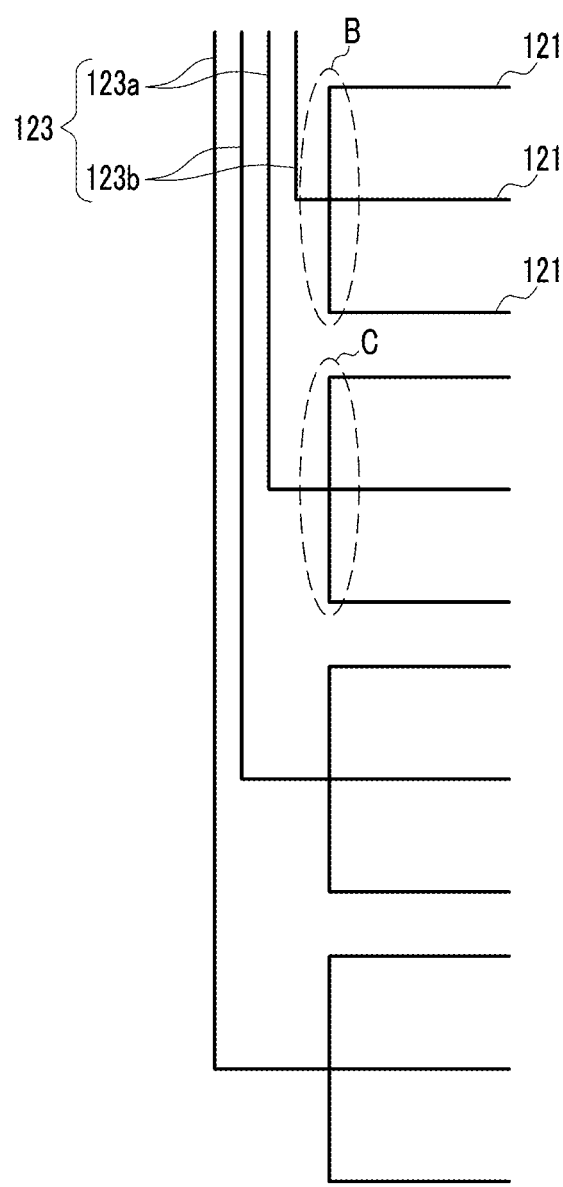
FIG. 11 is a plan view illustrating an exemplary embodiment of a connection part of a gate signal supply line and a gate line in a display device according to the invention.
Figure 12:
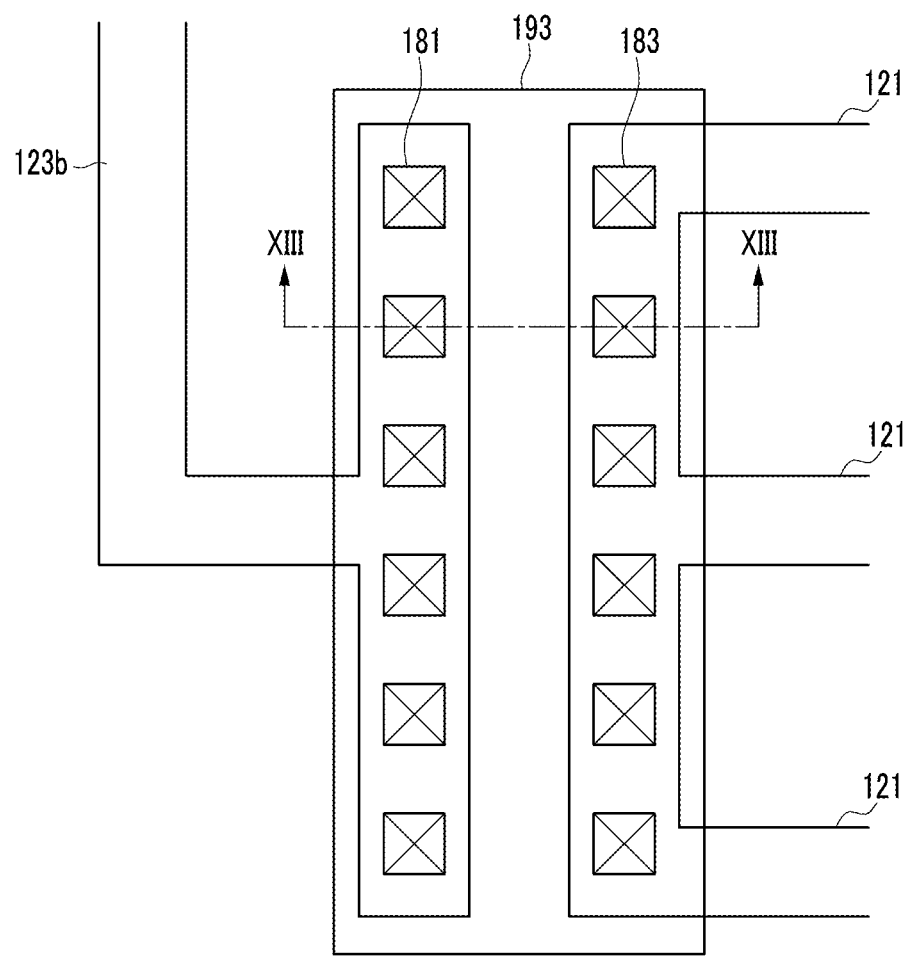
FIG. 12 is a partially enlarged view of an exemplary embodiment of region B of the display device in FIG. 11, according to the invention.
Figure 13:
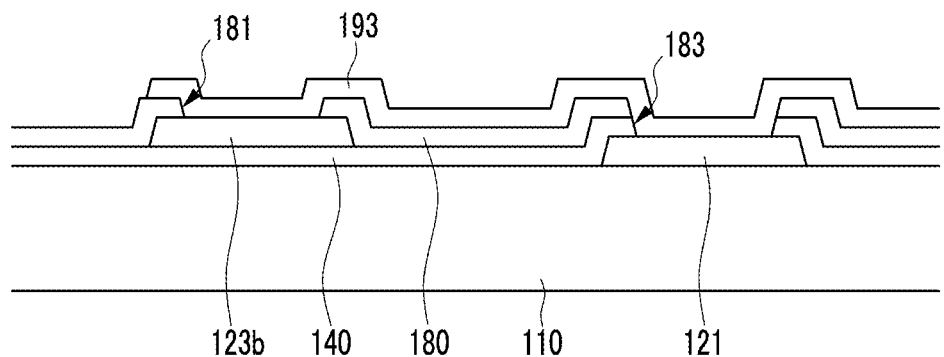
FIG. 13 is a partial cross-sectional view of the exemplary embodiment of the display device taken along line XIII-XIII of FIG. 12, according to the invention.
Figure 14:
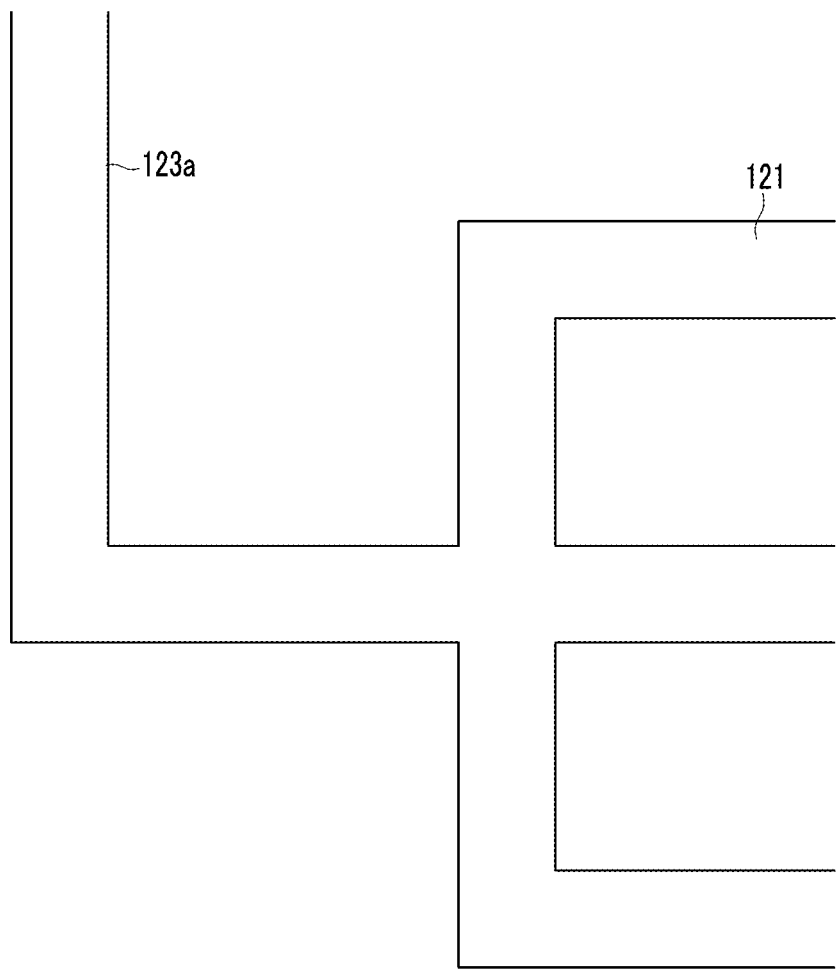
FIG. 14 is a partially enlarged view of an exemplary embodiment of region C of the display device in FIG. 11, according to the invention.

FIG. 11 is a plan view illustrating an exemplary embodiment of a connection part of a gate signal supply line and a gate line according to the invention. FIG. 12 is a partially enlarged view of an exemplary embodiment of region B of the display device in FIG. 11 according to the invention, and FIG. 13 is a partial cross-sectional view of the exemplary embodiment of the display device taken along XIII-XIII of FIG. 12 according to the invention. FIG. 14 is a partially enlarged view of an exemplary embodiment of region C of the display device in FIG. 11 according to the invention.

The exemplary embodiment of the gate signal supply line 123 of the display device according to the invention may include a first gate signal supply line 123*a* on and/or in a same layer as the gate line 121 and a second gate signal supply line 123*b* on and/or in a same layer as the data line (not shown).

Since the second gate signal supply line 123*b* is not on and/or in the same layer as the gate line 121, as shown in FIGS. 12 and 13, a separate member may be used in order to connect the second gate signal supply line 123*b* and the gate line 121.

Ends of three gate lines 121 are connected to each other at a common portion, and an end of the second gate signal supply line 123*b* faces a portion where the three gate lines 121 are connected to each other. The common portion of the ends of the three gate lines 121 and the end of the second gate supply line 123*b* may have a wide planar area.

A gate insulating layer 140 is on the gate line 121 and the first gate signal supply line 123*a*, and the second gate signal supply line 123*b* is on the gate insulating layer 140. A passivation layer 180 is on the gate insulating layer 140, the data line and the second gate signal supply line 123*b*.

A first contact hole 181 is extended through a thickness of the passivation layer 180 so as to expose at least a part of the second gate signal supply line 123*b*. The upper surface of the end of the second gate signal supply line 123*b* may be exposed by the first contact hole 181.

A second contact hole 183 is extended through a thickness of the gate insulating layer 140 and the passivation layer 180 so as to expose at least a part of the gate line 121. The upper surface of the end of the gate line 121 may be exposed by the second contact hole 183.

A first connection electrode 193, which is connected with the second gate signal supply line 123*b* through the first contact hole 181 and connected with the gate line 121 through the second contact hole 183, is on the passivation layer 180. The first connection electrode 193 may include indium tin oxide ("ITO"), indium zinc oxide ("IZO"), and the like, but is not limited thereto or thereby.

In order to lower resistance of the connection part of the second gate signal supply line 123*b* and the gate line 121, the number of the first contact hole 181 and the second contact hole 183 may be increased. The resistance of the connection part of the second gate signal supply line 123*b* and the first connection electrode 193 may be lowered by increasing the number of the first contact hole 181, and the resistance of the connection part of the gate line 121 and the first connection electrode 193 may be lowered by increasing the number of the second contact hole 183.

Since the first gate signal supply line 123*a* is on and/or in the same layer as the gate line 121, as shown in FIG. 14, the first gate signal supply line 123*a* and the gate line 121 may be directly electrically and/or physically connected with each other without a separate member. That is, the first gate signal supply line 123*a* and the three gate lines respectively connected thereto, form a single unitary indivisible member.

As described above, since the first gate signal supply line 123*a* and the gate line 121 are on and/or in the same layer of the display device, the first gate signal supply line 123*a* and the gate line 121 are directly connected with each other, but the invention is not limited thereto. The first gate signal supply line 123*a* and the gate line 121 may be indirectly connected with each other.

Hereinafter, an exemplary embodiment of the case where the first gate signal supply line 123*a* and the gate line 121 which are on and/or in the same layer of the display device are indirectly connected with each other will be described.

Figure 15:
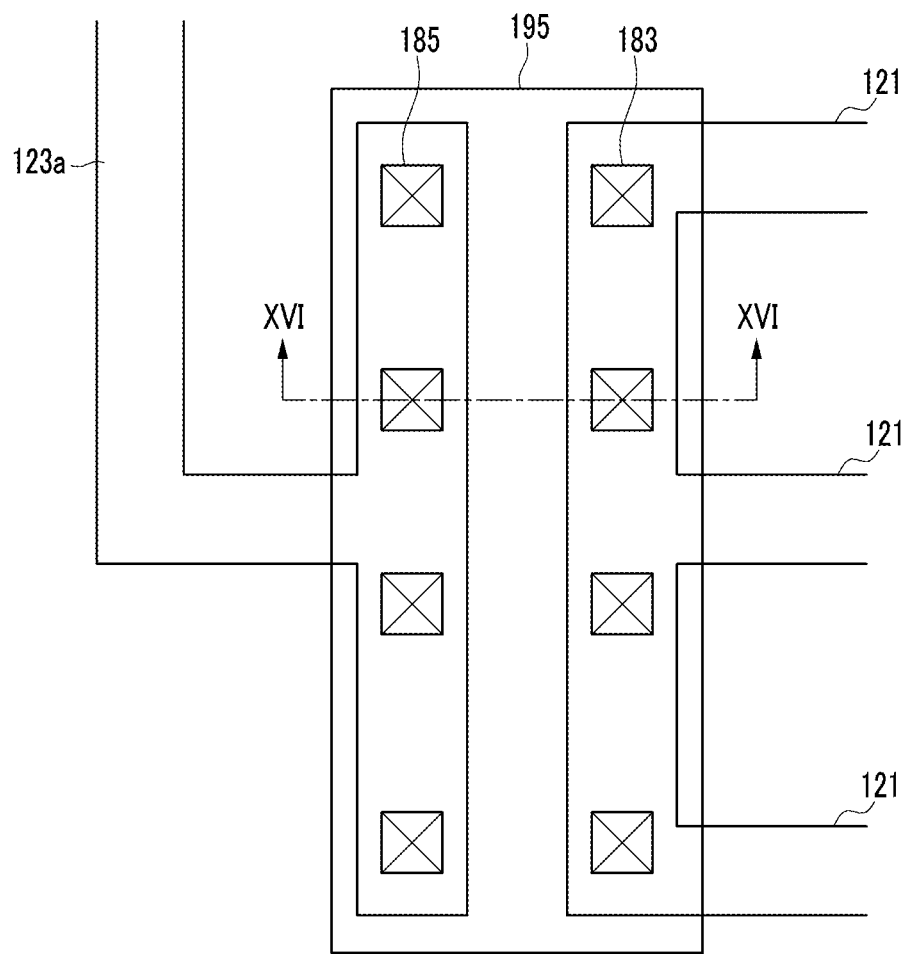
FIG. 15 is a partially enlarged view of another exemplary embodiment of region C of the display device in FIG. 11, according to the invention.
Figure 16:
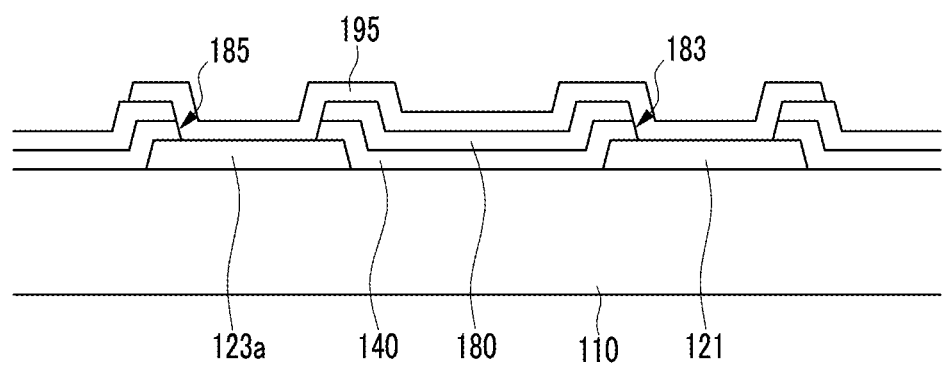
FIG. 16 is a partial cross-sectional view of the exemplary embodiment of the display device taken along line XVI-XVI of FIG. 15, according to the invention.

FIG. 15 is a partially enlarged view of another exemplary embodiment of region C of the display device in FIG. 11 according to the invention, and FIG. 16 is a partial cross-sectional view of the exemplary embodiment of the display device taken along XVI-XVI of FIG. 15 according to the invention.

The first gate signal supply line 123*a* and the gate line 121 are on and/or in the same layer, but are not directly connected with each other, and are connected by using a separate member as shown in FIGS. 15 and 16.

Ends of three gate lines 121 are connected to each other at a common portion, and an end of the first gate signal supply line 123*a* faces a portion where the three gate lines 121 are connected to each other. The common portion of the ends of the three gate lines 121 and the end of the first gate signal supply line 123*a* may have a wide planar area.

A third contact hole 185 is extended through a thickness of the gate insulating layer 140 and the passivation layer 180 so as to expose at least a part of the first gate signal supply line 123*a*. The upper surface of the end of the first gate signal supply line 123*a* may be exposed by the third contact hole 185.

A second connection electrode 195 which is connected with the first gate signal supply line 123*a* through the third contact hole 185 and connected with the gate line 121 through the second contact hole 183, is on the passivation layer 180. The second connection electrode 195 may include indium tin oxide ("ITO"), indium zinc oxide ("IZO"), and the like, but is not limited thereto or thereby.

The number of the first contact hole 181 and the third contact hole 185 may be different. Further, the number of the second contact hole 183 on the gate line 121 connected with the second gate signal supply line 123*b* may be different from the number of the second contact hole 183 on the gate line 121 connected with the first gate signal supply line 123*a*.

Resistance of each connection part varies according to the number of the first to third contact holes 181, 183 and 185. Accordingly, resistance between the first gate signal supply line 123*a* and the gate line 121 and resistance between the second gate signal supply line 123*b* and the gate line 121 may be substantially the same as each other by controlling the number of the first to third contact holes 181, 183 and 185.

In one exemplary embodiment, for example, when the resistance between the second gate signal supply line 123*b* and the first connection electrode 193 is larger than the resistance between the first gate signal supply line 123*a* and the second connection electrode 195, the number of the first contact holes 181 may be larger than the number of the third contact holes 185. Further, a number of the second contact holes 183 on the gate line 121 connected with the second gate signal supply line 123*b* may be larger than the number of the second contact holes 183 on the gate line 121 connected with the first gate signal supply line 123*a*.

As described above, the resistance of each connection part is the same by controlling the number of the first to third contact holes 181, 183 and 185, but the invention is not limited thereto. The resistance of each connection part may also be substantially the same by controlling the sizes (e.g., planar area and the like) of the first to third contact holes 181, 183 and 185.

In FIGS. 11 to 16, the gate signal supply line 123 has a shape which extends down in a vertical direction to the gate line 121 and then is bent once at a portion connected with the gate line 121, but the invention is not limited thereto and may have another shape.

Figure 17:
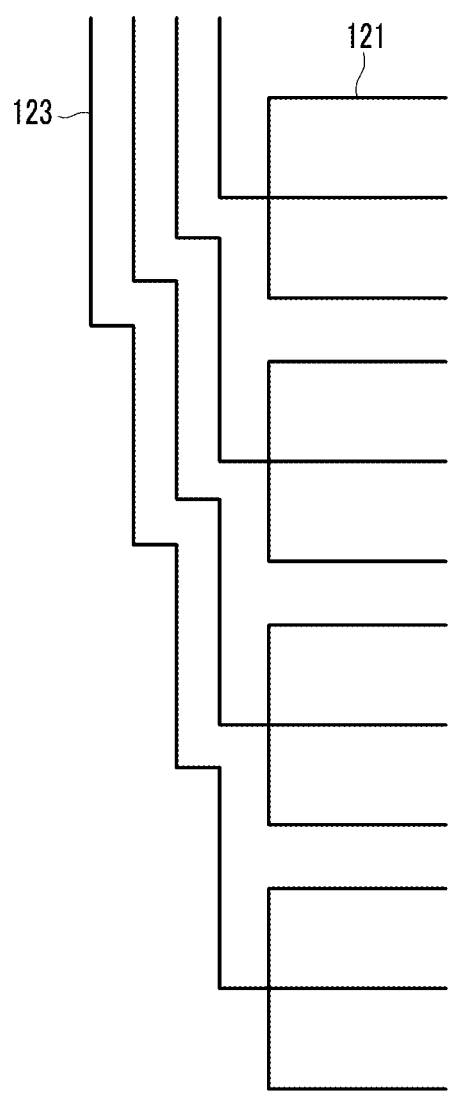
FIG. 17 is a plan view illustrating another exemplary embodiment of a connection part of a gate signal supply line and a gate line, according to the invention.

Referring to FIG. 17, the gate signal supply line 123 may have a shape including several bends.

FIG. 17 is a plan view illustrating another exemplary embodiment of a connection part of a gate signal supply line and a gate line according to the invention.

As shown in FIG. 17, the gate signal supply line 123 may have a step shape in the plan view. Although not shown, an upper end of the gate signal supply line 123 is connected with the gate driver.

As the gate signal supply line 123 is far away from the gate driver, the number of steps is gradually increased. In the illustrated exemplary embodiment, for example, the gate signal supply line 123 which is disposed at the rightmost side has a once-bent shape. In the illustrated exemplary embodiment, for example, the gate signal supply line 123 which is disposed at the second from the right has a twice-bent shape. In the illustrated exemplary embodiment, for example, the gate signal supply line 123 which is disposed at the third from the right has a three times-bent shape. In the illustrated exemplary embodiment, for example, the gate signal supply line 123 which is disposed at the fourth from the right has a four times-bent shape.

As compared with the case shown in FIG. 11, spaces between adjacent gate signal supply lines 123, a space between the gate signal supply line 123 and the gate line 121, and the like may be reduced by the shapes of the signal lines in the plan view. Further, since an empty space occurs at the left of the gate signal supply line 123 disposed at the leftmost side by the reduced space, the spaces may be used to form other signal lines. As a result, it is possible to reduce a bezel width of the display device at a portion in which the gate signal supply line 123 is disposed.

Next, an exemplary embodiment of a layout form of gate signal supply lines and gate lines connected with a plurality of gate drivers and a layout form of data lines connected with a plurality of data drivers will be described.

Figure 18:
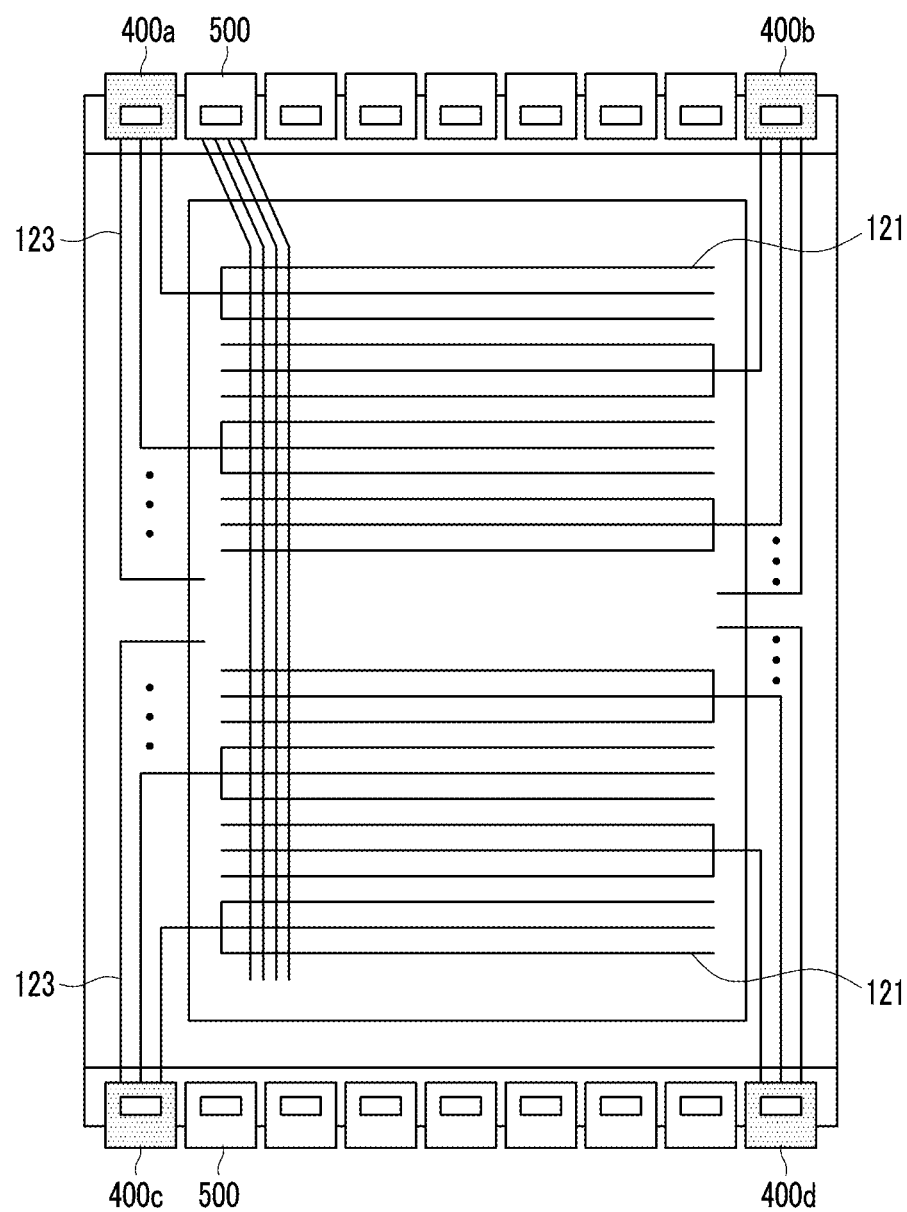
FIG. 18 is a plan view illustrating an exemplary embodiment of a plan view of a gate signal supply line connected with a plurality of gate drivers and a data line connected with a plurality of data drivers in a display device according to the invention.

FIG. 18 is a plan view illustrating an exemplary embodiment of a plan view of a gate signal supply line connected with a plurality of gate drivers and a data line connected with a plurality of data drivers in the display device according to the invention.

A layout form of the gate driver 400 and the data driver 500 is the same as the structure described in FIG. 5.

A plurality of gate signal supply lines 123 is connected with one gate driver 400, and three gate lines 121 are connected with one gate signal supply line 123.

The gate lines 121 connected to the gate signal supply line 123 connected with the first gate driver 400*a* and the gate lines 121 connected to the gate signal supply line 123 connected with the second gate driver 400*b*, are alternately disposed from a first end of the display device.

In the illustrated exemplary embodiment, for example, three gate lines 121 connected to the gate signal supply line 123 connected with the first gate driver 400*a* are first disposed at an upper portion of FIG. 18. Next, three gate lines 121 connected to the gate signal supply line 123 connected with the second gate driver 400*b* are disposed therebelow. Next, three gate lines 121 connected to the gate signal supply line 123 connected with the first gate driver 400*a* are disposed therebelow.

That is, the gate lines 121 connected to the gate signal supply line 123 connected with the first gate driver 400*a* and the gate lines 121 connected to the gate signal supply line 123 connected with the second gate driver 400*b* are alternately disposed for every three gate lines.

If the gate signal supply line 123 is connected with 'n' gate lines 121, the gate lines may be alternately disposed for every 'n' gate lines, where 'n' is a natural number.

The gate lines 121 connected to the gate signal supply line 123 connected with the third gate driver 400*c* and the gate lines 121 connected to the gate signal supply line 123 connected with the fourth gate driver 400*d* are alternately disposed from a lower end of the display device.

A plurality of data lines 171 is connected with one data driver 500. The data lines 171 connected with the one data driver 500 at the upper side of the display device are connected from the upper half portion to the lower half portion of the display device.

As shown in FIG. 18, a mode of driving gate lines disposed in different rows by different gate drivers is called an interlace gate driving mode.

The layout form of the gate signal supply line and the data lines may be variously modified, and a modified example will be described below.

Figure 19:
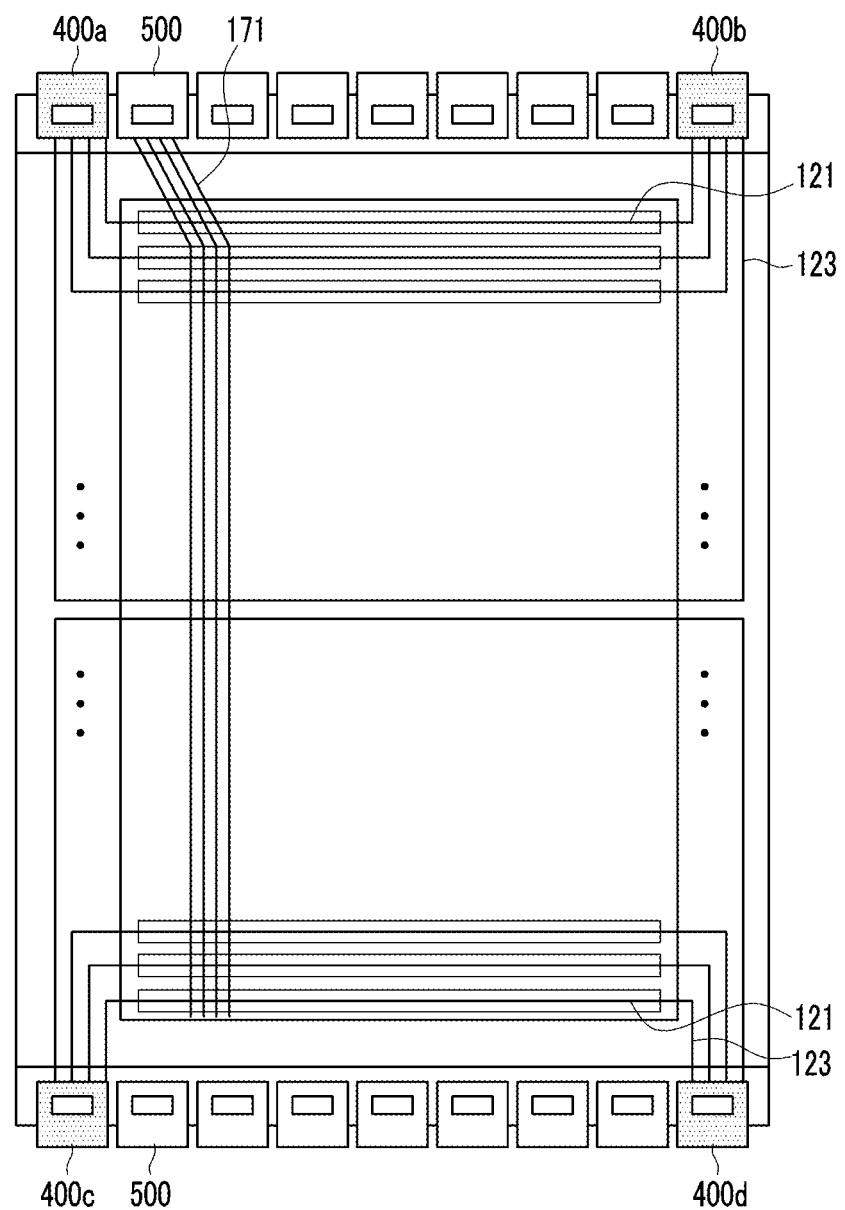
FIG. 19 is a plan view illustrating another exemplary embodiment of a plan view of gate signal supply lines and data lines in a display device according to the invention.

FIG. 19 is a plan view illustrating another exemplary embodiment of a plan view of gate signal supply lines and data lines in the display device according to the invention.

As shown in FIG. 19, the gate lines 121 connected to the gate signal supply line 123 connected with the first gate driver 400*a* and the gate lines 121 connected to the gate signal supply line 123 connected with the second gate driver 400*b* may be positioned in the same row or rows.

Further, the gate lines 121 connected to the gate signal supply line 123 connected with the third gate driver 400*c* and the gate lines 121 connected to the gate signal supply line 123 connected with the fourth gate driver 400*d* may also be positioned in the same row or rows.

In the illustrated layout form, gate signals are transferred to pixels disposed at the left half portion of the display device from the first gate driver 400a and the third gate driver 400c. Gate signals are transferred to pixels disposed at the right half portion of the display device from the second gate driver 400b and the fourth gate driver 400d.

Accordingly, since the gate signals are simultaneously applied from the left and the right of the gate lines 121 disposed in the same row or rows, the gate signals are not distorted and may be transferred well to a point relatively far away from the gate signal supply line 123.

As shown in FIG. 19, a mode of driving gate lines disposed in the same row by different gate drivers is called a dual gate driving mode.

In the interlace gate driving mode, since the number of gate signal supply lines 123 may be further decreased, the interlace gate driving mode is more advantageous than the dual gate driving mode from the viewpoint of reduction of a bezel width.

Next, yet another layout form of gate signal supply lines and data lines will be described below with reference to FIGS. 20 and 21.

Figure 20:
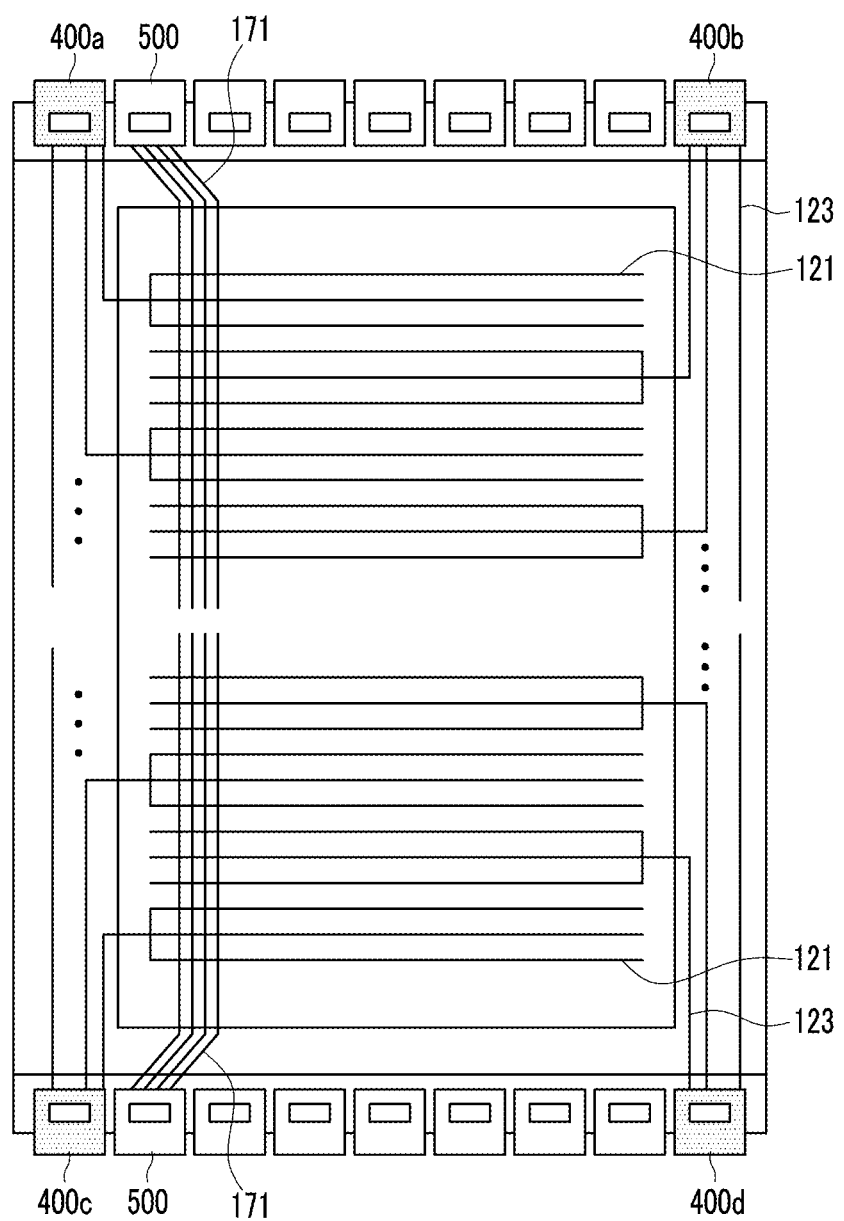
FIGS. 20 and 21 are plan views illustrating yet other exemplary embodiments of a plan view of gate signal supply lines and data lines in a display device according to the invention.
Figure 21:
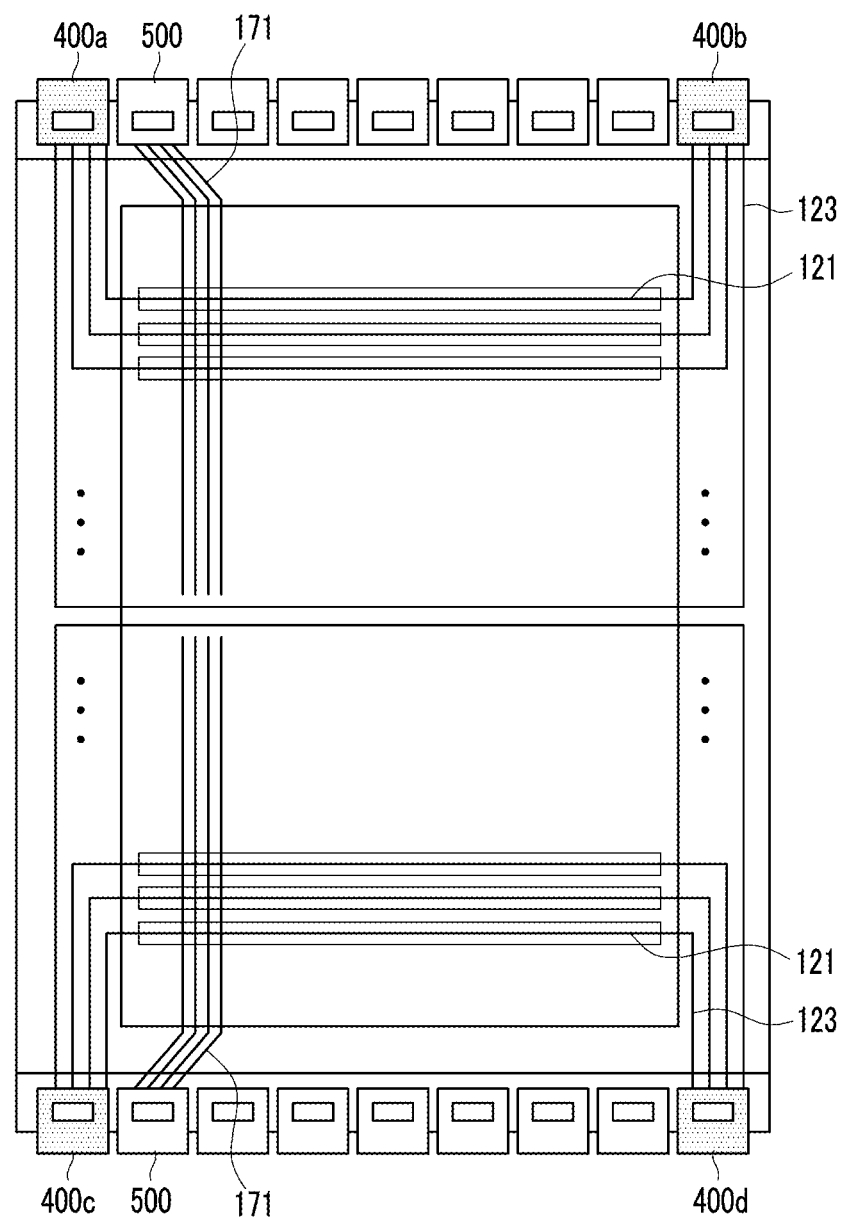

FIGS. 20 and 21 are plan views illustrating yet other exemplary embodiments of a plan view of gate signal supply lines and data lines in a display device according to the invention.

In FIGS. 20 and 21, a data line 171 at the upper half portion of the display device is separated from a data line 171 at the lower half portion of the display device, while the data lines 171 are connected from the upper half portion to the lower half portion in FIGS. 18 and 19.

Referring to FIGS. 20 and 21, a data line 171 connected with a data driver 500 at the upper side of the display device and a data line 171 connected with a data driver 500 at the lower side of the display device are positioned in the same column or columns.

In the layout form, data signals are transferred from the data driver 500 at the upper side of the display device to pixels disposed at the upper half portion of the display device. Data signals are transferred from the data driver 500 at the lower side of the display device to pixels disposed at the lower half portion of the display device Accordingly, since the data signals are simultaneously applied from the upper side and the lower side of the data lines 171 disposed in the same column, it is possible to ensure more charging times.

FIG. 20 is a case where a structure in which the data lines 171 are vertically separated from each other is applied in the interlace gate driving mode, and FIG. 21 is a case where a structure in which the data lines 171 are vertically separated from each other is applied in the dual gate driving mode.

Figure 22:
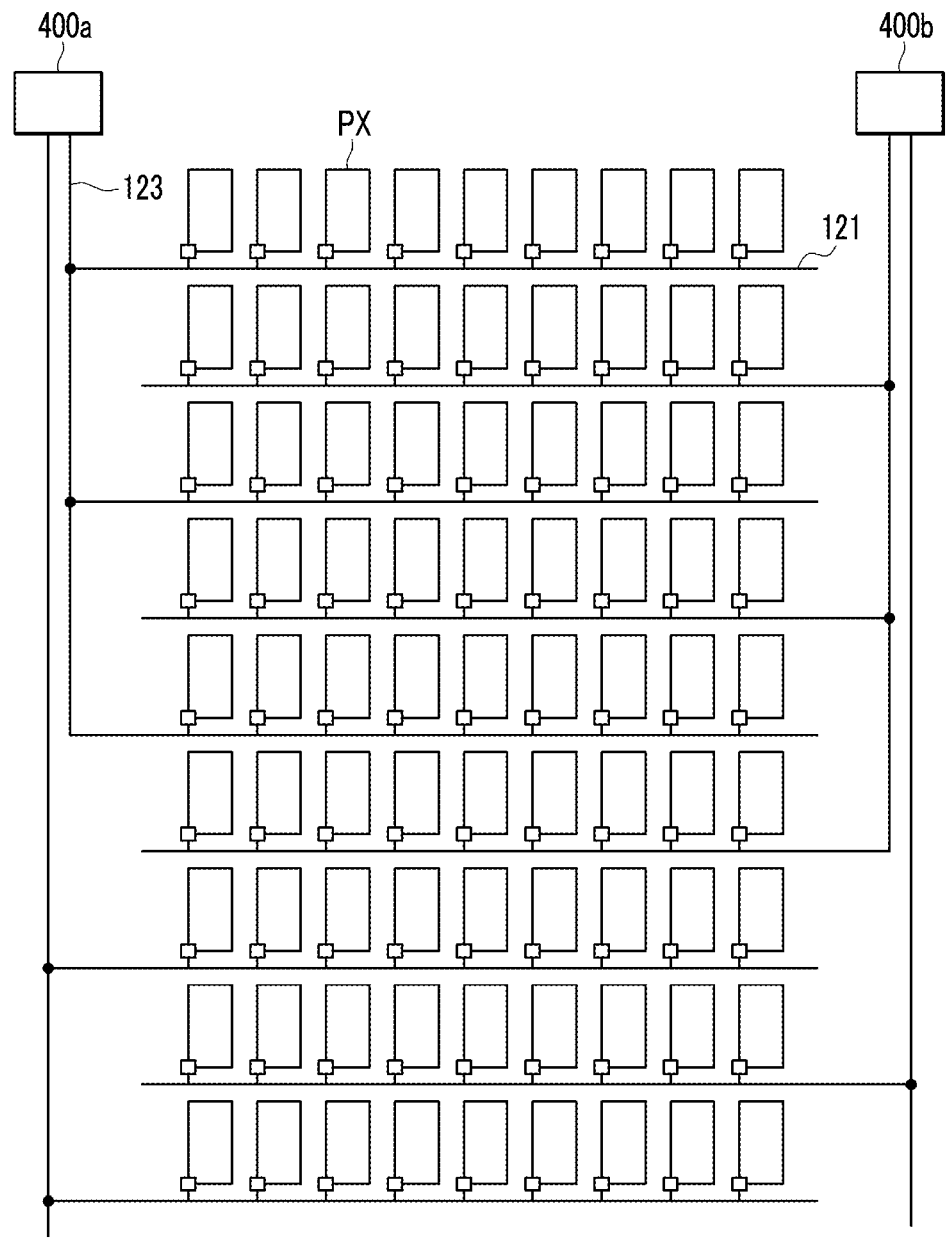
FIG. 22 is a plan view illustrating another exemplary embodiment of a plan view of gate signal supply lines and gate lines in a display device according to the invention.

In the description relating to FIG. 18, the plurality of gate lines connected to one gate signal supply line are continuously disposed, but the invention is not limited thereto. As shown in FIG. 22, the plurality of gate lines connected to one gate signal supply line may not be continuously disposed.

FIG. 22 is a plan view illustrating another exemplary embodiment of a plan view of gate signal supply lines and gate lines in a display device according to the invention.

As shown in FIG. 22, gate lines 121 connected to the gate signal supply line 123 connected with the first gate driver 400a and gate lines 121 connected to the gate signal supply line 123 connected with the second gate driver 400b may be alternately disposed for every one gate line.

In the illustrated exemplary embodiment, for example, the first gate line 121 among three gate lines 121 connected to the gate signal supply line 123 connected with the second gate driver 400b is between the first gate line 121 and the second gate line 121 among three gate lines 121 connected to the gate signal supply line 123 connected with the first gate driver 400a.

Next, the second gate line 121 among three gate lines 121 connected to the gate signal supply line 123 connected with the second gate driver 400b is between the second gate line 121 and the third gate line 121 among three gate lines 121 connected to the gate signal supply line 123 connected with the first gate driver 400a.

Next, the third gate line 121 among three gate lines 121 connected to the gate signal supply line 123 connected with the second gate driver 400b is below the third gate line 121 among three gate lines 121 connected to the gate signal supply line 123 connected with the first gate driver 400a.

In the case where three subsequent gate lines are connected with one gate signal supply line to be driven in the interlace driving mode, a deviation in signal delay between the subsequent three gate lines and the next three gate lines may be recognized. In FIG. 22, since the gate lines connected to the same gate signal supply line are not subsequently disposed, the recognition of the deviation may be reduced.

Next, a case where a DEMUX switch may be further included so that data signals are applied to a plurality of data lines between two adjacent pixels in sequence will be described.

Figure 23:
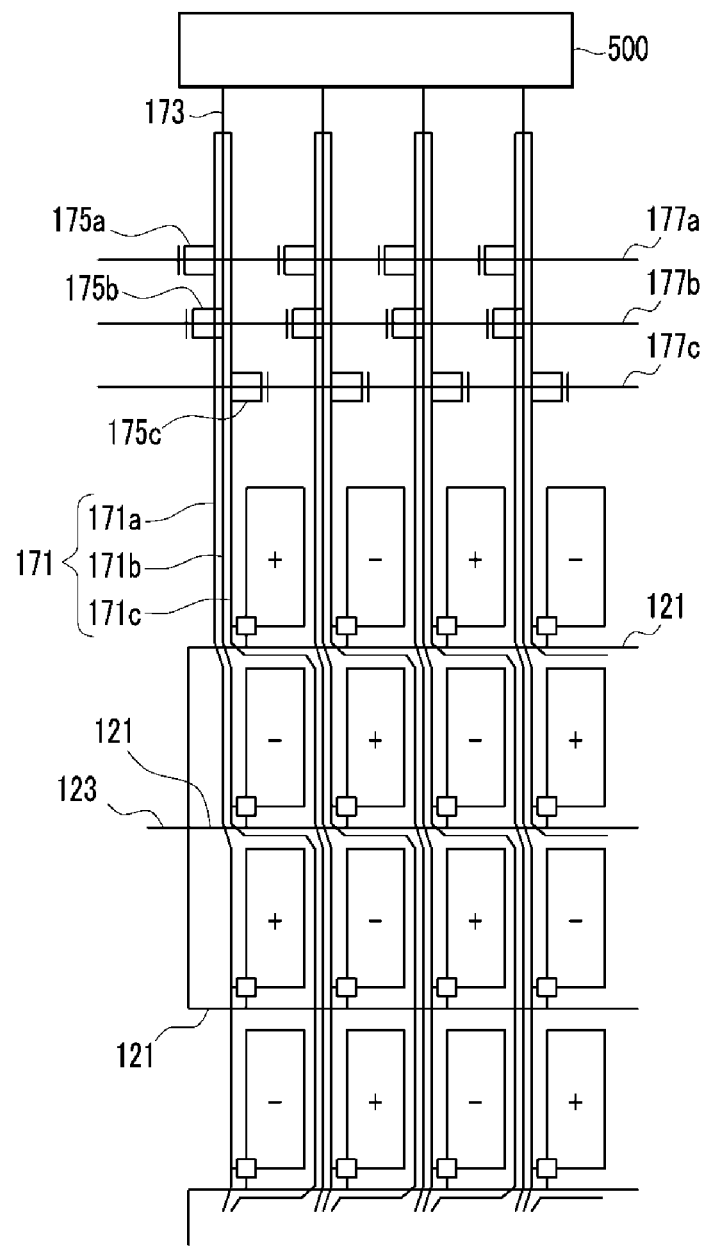
FIG. 23 is a plan view illustrating an exemplary embodiment of a connection part of a data line and a data driver in a display device according to the invention.

FIG. 23 is a plan view illustrating an exemplary embodiment of a connection part of a data line and a data driver in a display device according to the invention.

A data signal supply line 173 is further between the data driver 500 and the data line 171. A switching element 175 is further between the data signal supply line 173 and the data line 171.

The data signal supply line 173 may be connected with at least three data lines 171 and thus a plurality of switching elements 175 may be included.

In the illustrated exemplary embodiment, for example, three data lines 171 positioned between two pixels PX adjacent to each other in a row direction may be connected with one data signal supply line 173. The three data lines 171 include a first data line 171a, a second data line 171b and a third data line 171c.

A first switching element 175a may be between the data signal supply line 173 and the first data line 171a, a second switching element 175b may be between the data signal supply line 173 and the second data line 171b, and a third switching element 175c may be between the data signal supply line 173 and the third data line 171c.

Data signals are sequentially applied to the plurality of data lines 171 connected to the data signal supply line 173. That is, after the data signal is applied to the first data line 171a, the data signal is applied to the second data line 171b and then the data signal is applied to the third data line 171c.

Input terminals of the first to third switching elements 175a, 175b and 175c are connected to the same data signal supply line 173, and output terminals of the first to third switching elements 175a, 175b and 175c are connected to the first to third data lines 171a, 171b, and 171c respectively.

Control terminals of the first to third switching elements 175a, 175b and 175c are connected to a first control signal line 177a, a second control signal line 177b and a third control signal line 177c, respectively. Signals capable of controlling the first to third switching elements 175a, 175b and 175c are sequentially applied to the first to third control signal lines 177a, 177b and 177c.

When the first switching element 175a is in a gate-on state, the data signal is applied to the first data line 171a through the data signal supply line 173. When the second switching element 175b is in a gate-on state, the data signal is applied to the second data line 171b through the data signal supply line 173. When the third switching element 175c is in a gate-on state, the data signal is applied to the third data line 171c through the data signal supply line 173.

That is, the data signals are applied to the first to third data lines 171a, 171b and 171c through the same data signal supply line 173 at different times, such that it is possible to reduce the number of data drivers.

The structure of the pixels and the data lines shown in FIG. 23 is the same as the structure of the pixels and the data lines shown in FIG. 1. However, the invention is not limited thereto, and three data lines connected to the data signal supply line may be disposed like the data lines shown in FIGS. 2 to 3.

Further, as shown in FIG. 4, four data lines including the first to fourth data lines may be disposed between two pixels adjacent to each other in a row direction, and the data signal supply line may be connected with the first to fourth data lines, respectively. The first to fourth switching elements are between the data signal supply line and the first to fourth data lines. Data signals are sequentially applied to the first to fourth data lines connected with one data signal supply line. Control terminals of the first to fourth switching elements are connected to the first to fourth control signal lines, and signal capable of controlling the first to fourth switching elements are sequentially applied to the first to fourth control signal lines.

That is, the data signals are applied to the first to fourth data lines through the same data signal supply line at different times, such that it is possible to reduce the number of data drivers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
   a plurality of gate lines extending in a row direction;
   a plurality of data lines extending in a row direction and a column direction;
   a plurality of pixels connected to the gate lines and the data lines; and
   a singular gate signal supply line connected with at least three gate lines among the plurality of gate lines,
   wherein a set of data lines among the plurality of data lines are between two pixels adjacent to each other in the row direction, and
   three edges of a pixel set comprising at least two pixel of the plurality of pixels is enclosed by at least one of the set of data lines.

2. The display device of claim 1, wherein:
   the singular gate signal supply line is connected to three gate lines, and
   three data lines are between the two pixels adjacent to each other in the row direction.

3. The display device of claim 2, wherein:
   the three data lines between the two pixels adjacent to each other in the row direction comprises a first data line, a second data line and a third data line,
   the first to third data lines are connected to different pixels,
   the first data line is connected to two pixels adjacent to each other in a column direction,
   the second data line is connected to two pixels adjacent to the two pixels connected to the first data line, at an upper side and at a lower side, respectively, in the column direction, and
   the third data line is connected to two pixels adjacent to the two pixels connected to the second data line, at an upper side and at a lower side, respectively, in the column direction.

4. The display device of claim 3, wherein:
   the first data line extends in the column direction,
   the second data line is at the right of the first data line and surrounds the two pixels connected to the first data line, and
   the third data line is at the right of the second data line and surrounds the two pixels connected to the first data line and the two pixels connected to the second data line.

5. The display device of claim 2, wherein:
   the three data lines between the two pixels adjacent to each other in the row direction comprise a first data line, a second data line and a third data line,
   the first to third data lines are connected to different pixels,
   the first and third data lines are respectively connected to two pixels adjacent to each other in a column direction, wherein three pixels are between the two adjacent pixels,
   the second data line is connected to two pixels adjacent to each other in a diagonal direction,
   the two pixels connected to the first data line are in the same column as a pixel at the left of the two pixels connected to the second data line, and
   the two pixels connected to the third data line are in the same column as a pixel at the right of the two pixels connected to the second data line.

6. The display device of claim 5, wherein:
   the second data line extends in the column direction,
   the first data line is at the left of the second data line and formed to surround a pixel at the left of the two pixels connected to the second data line, and
   the third data line is at the right of the second data line and formed to surround a pixel at the right of the two pixels connected to the second data line.

7. The display device of claim 2, wherein:
   the three data lines between the two pixels adjacent to each other in the row direction comprise a first data line, a second data line and a third data line,
   the first to third data lines are connected to different pixels,
   the second data line is connected to two pixels adjacent to each other in a diagonal direction, the two pixels connected to the second data line comprising a left pixel and a right pixel,
   the third data line is connected to a pixel at an upper side of the left pixel and a pixel at a lower side of the right pixel, and
   the first data line is connected to two pixels adjacent to the two pixels connected to the third data line, in a diagonal direction, the two pixels connected to the first data line comprising an upper pixel and a lower pixel.

8. The display device of claim 7, wherein:
   the first data line surrounds two pixels between the lower pixel connected to the first data line and the left pixel connected to the second data line,
   the second data line is at the right of the first data line, and surrounds the two pixels surrounded by the first data line, the left pixel connected to the second data line and the lower pixel connected to the first data line, and
   the third data line is at the right of the second data line, and surrounds the four pixels surrounded by the second data line, a pixel at an upper side of the four pixels surrounded by the second data line, and the right pixel connected to the second data line.

9. The display device of claim 1, wherein:
the singular gate signal supply line is connected to three gate lines,
four data lines comprising a first data line, a second data line, a third data line and a fourth data line are between the two pixels adjacent to each other in the row direction,
the first to fourth data lines are connected to different pixels,
the second data line is connected to two pixels adjacent to each other in a column direction,
the first data line is connected to a pixel at a lower side of the two pixels connected to the second data line, in the column direction,
the third data line is connected to a pixel adjacent to the pixel connected to the second data line, in the column direction, with one pixel therebetween, and
the fourth data line is connected to a pixel adjacent to the pixel connected to the first data line and the pixel connected to the second data line, in a diagonal direction.

10. The display device of claim 9, wherein:
the first and second data lines surround the two pixels adjacent to each other in the column direction and connected to the second data line, and
the third and fourth data lines extend in the column direction.

11. The display device of claim 1, further comprising
a first gate signal supply line comprising a same metal as the at least two gate lines; and
a second gate signal supply line comprising a same metal as the at least three data lines.

12. The display device of claim 11, further comprising:
a gate insulating layer on the at least two gate lines and on the first gate signal supply line;
a passivation layer on the gate insulating layer, the at least three data lines and the second gate signal supply line;
a first contact hole in the passivation layer, wherein the first contact hole exposes the second gate signal supply line;
a second contact hole in the gate insulating layer and in the passivation layer, wherein the second contact hole exposes the at least two gate lines; and
a first connection electrode connected with the second gate signal supply line through the first contact hole and connected with the at least two gate lines through the second contact hole.

13. The display device of claim 12, wherein:
the first gate signal supply line is directly connected with the at least two gate lines.

14. The display device of claim 12, further comprising:
a third contact hole in the gate insulating layer and the passivation layer, wherein the third contact hole exposes the first gate signal supply line; and
a second connection electrode connected with the first gate signal supply line through the third contact hole and connected with the at least two gate lines through the second contact hole.

15. The display device of claim 14, wherein:
a number of first contact holes and a number of third contact holes are different from each other, and
electrical resistance between the first gate signal supply line and the at least two gate lines is the same as electrical resistance between the second gate signal supply line and the at least two gate lines.

16. The display device of claim 1, further comprising:
a gate driver which supplies a gate signal to the gate signal supply line; and
a data driver which supplies a data signal to the at least three data lines.

17. The display device of claim 16, wherein:
the singular gate signal supply line has a once-bent structure.

18. The display device of claim 16, wherein:
the singular gate signal supply line has a step shape, and the number of steps is gradually increased as a distance from the gate driver increases.

19. The display device of claim 16, wherein:
the data driver is at one side of the display device, and
further comprising: a first gate driver and a second gate driver at opposing edges of the one side of the display device.

20. The display device of claim 19, wherein:
a gate line connected to the singular gate signal supply line connected with the first gate driver and a gate line connected to the singular gate signal supply line connected with the second gate driver, are in different rows of the display device.

21. The display device of claim 20, wherein:
the singular gate signal supply line is connected with three gate lines, respectively, and
gate lines connected to the singular gate signal supply line connected with the first gate driver and gate lines connected to the singular gate signal supply line connected with the second gate driver alternate every three gate lines.

22. The display device of claim 20, wherein:
the singular gate signal supply line is connected with three gate lines, respectively, and
gate lines connected to the singular gate signal supply line connected with the first gate driver and gate lines connected to the singular gate signal supply line connected with the second gate driver alternate every one gate line.

23. The display device of claim 20, further comprising:
the data driver at another side of the display device facing the one side of the display device, and
a third gate driver and a fourth gate driver at opposing edges of the another side,
wherein
a data line connected with the data driver at the one side of the display device and a data line connected with the data driver at the another side of the display device, are in a same column of the display device.

24. The display device of claim 19, wherein:
a gate line connected to the singular gate signal supply line connected with the first gate driver and a gate line connected to the singular gate signal supply line connected with the second gate driver are in a same row.

25. The display device of claim 24, further comprising:
the data driver at another side facing the one side of the display device,
a third gate driver and a fourth gate driver at opposing edges of the another side, and
a data line connected with the data driver at the one side of the display device and a data line connected with the data driver at the another side of the display device are in a same column.

26. The display device of claim 16, further comprising:
a data signal supply line connected between the data driver and the at least three data lines,
wherein data signals are sequentially applied to the at least three data lines.

27. The display device of claim 26, wherein:
the data signal supply line is connected with three data lines comprising a first data line, a second data line and a third data line,
further comprising:
a first switching element connected between the data signal supply line and the first data line;
a second switching element connected between the data signal supply line and the second data line; and
a third switching element connected between the data signal supply line and the third data line,
wherein the first to third switching elements are sequentially in a gate-on state.

* * * * *